(12) United States Patent
Morimoto et al.

(10) Patent No.: US 6,584,055 B1
(45) Date of Patent: Jun. 24, 2003

(54) DISK DEVICE FOR DISKS HAVING DIFFERENT SIZES

(75) Inventors: Takao Morimoto, Tokyo (JP); Masao Sato, Tokyo (JP); Tatsunori Fujiwara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/685,032

(22) Filed: Oct. 10, 2000

Related U.S. Application Data

(63) Continuation of application No. PCT/JP99/00594, filed on Feb. 12, 1999.

(51) Int. Cl.$^7$ ............................................. G11B 33/02
(52) U.S. Cl. ......................................................... 369/77.1
(58) Field of Search ................................ 369/77.1, 77.2, 369/75.1, 75.2; 360/99.02, 99.03, 99.06, 99.07

(56) References Cited

U.S. PATENT DOCUMENTS

| | | | | |
|---|---|---|---|---|
| 5,274,620 A | * | 12/1993 | Sipos | 360/99.06 |
| 5,737,293 A | * | 4/1998 | Kawamura et al. | 369/77.1 |
| 6,009,062 A | * | 12/1999 | Nashimoto et al. | 369/77.2 |
| 2001/0001267 A1 | * | 5/2001 | Fujiwara | 369/75.1 |
| 2001/0001606 A1 | * | 5/2001 | Horie | 369/77.2 |
| 2001/0002184 A1 | * | 5/2001 | Morimoto | 369/75.1 |

FOREIGN PATENT DOCUMENTS

| JP | 7201113 | | 4/1995 |
|---|---|---|---|
| JP | 887796 | | 4/1996 |
| JP | 08087796 A | * | 4/1996 |
| JP | 08167212 A | * | 6/1996 |

* cited by examiner

Primary Examiner—Hoa T. Nguyen
Assistant Examiner—Chen Tianjie
(74) Attorney, Agent, or Firm—Birch, Stewart, Kolasch & Birch, LLP

(57) ABSTRACT

A disk device is provided with an MD carrying mechanism which uptakes an MD 24, places the MD 24 on a turntable, and performs the ejection of the MD 24 from the turntable by the displacement of the holder drawing lever 39 which forms part of a linking mechanism when the cartridge of the MD 24 is inserted into an MD holder. The disk device also comprises a clamp lever avoidance mechanism which refuges the clamp lever 17, which is used for clamping the CD 200, to a position which does not interfere with the uptake and ejection of the MD during uptake and ejection of the MD by the MD carrying mechanism.

15 Claims, 26 Drawing Sheets

DISK DEVICE FOR DISKS HAVING DIFFERENT SIZES

CROSS-REFERENCE TO THE RELATED APPLICATION

This Application is a continuation of International Application No. PCT/JP99/00594, whose International filing date is Feb. 12, 1999, the disclosures of which Application are incorporated by reference herein.

BACKGROUND OF THE INVENTION

1. Field of the Invention

The present invention relates to a disk device which can load information recording media of different types on a turntable and eject the information recording media from the turntable. Such information recording media may include an MD (Mini Disk) for example which is stored in a cartridge or a CD (Compact disk) which is used as a single disk.

2. Description of the Related Art

FIGS. 1 and 2 are schematic lateral figures of a loading device which is disclosed in for example JP-A-8-87796. FIG. 3 is a similar schematic plan figure. In FIGS. 1 and 2, reference numeral 400 denotes a disk which is a circular information recording medium, 401 is a cartridge in which an information recording medium 401a is stored, 399 is an insertion aperture of a cartridge 401 or a disk 400 provided in the front face of the device. 410 is a first roller the surface of which is formed by a high friction elastic member such as rubber, and which rotates bi-directionally in the direction of the arrow 410A or 410B about a fixed shaft 410a. 420 is a second roller the surface of which is formed by a high friction elastic member such as rubber, and which rotates bi-directionally in the direction of the arrow 420A or 420B about a fixed shaft 420a. 423 is a second guiding body which is supported in free rotation about a fixed shaft 423a. 421 is a second guiding face which is provided on the second guiding body 423 and which has low frictional resistance due to the provision of a resin coating or the like. 422 is a second contacting means one end of which is fixed and the other end of which is compressed so that the second guiding face 421 of the second guiding body 423 is pressed onto the second roller 420. 413 is a first guiding body which is provided on the second guiding body 423 and which is supported in free rotation about an shaft 413a. 411 is a first guiding face which is provided on a first guiding body 413 and which has low frictional resistance due to the provision of a resin coating or the like. 412 is a first contacting means one end of which is fixed to the second guiding body 423 and the other end of which is compressed so that the first guiding face 411 of the first guiding body 413 is pressed onto the first roller 410. 424 is a cam which is normally pressed onto the second guiding body 423 by the second contacting means 422. The cam 424 supports the second guiding body 423 by rotational movement so that the second guiding body 423 is supported in two positions, one high and one low. 301 is a head chassis which is supported in free rotation about an enlarging central shaft 301a. 310 is a head which performs recording and playing of the disk 400 or the information recording medium 401a stored in the cartridge 401. 311 is a guide shaft which is fixed at both ends to the head chassis 301. The guide shaft 311 supports the head 310 and guides the head 310 through sliding motion in the direction of the arrow 310A or 310B. 312 is a disk motor which is identified with the head chassis 301. 313 is a turntable which is fixed to a rotational axis of the disk motor 312 and which is provided with a magnetic plate 313a on its upper face. 302 is a clamp arm which is supported to be rotatable about the enlarging central shaft 301a. 321 is a clamp which is supported to be rotatable about the clamp arm 302 and which is provided on the lower face of the magnetic plate 321a. 330 is a sensor which is disposed in proximity to an insertion aperture 399 and which detects a cartridge 401 or a disk 400. 331 is a sensor which detects a recording/playing position of a disk 400 at the innermost position of the device. 428 is a cartridge stopper which determines a recording/playing position of a cartridge 401.

With reference to FIG. 3, 415 is a disk position determining arm which is supported to be rotatable about a fixed shaft 415a. 416 is a disk position determining pin (stopper member) which is fixed to the distal rotational end of the disk position determining arm 415 and which extends downwardly to a height which obstructs the carrying path of the disk 400. 417 is a compression means which provides pressure so that the disk position determining pin 416 rotates the disk positioning arm 415 in the direction of the arrow 415A so that it separates from the positioned disk 400. 425 is a disk position release arm which is supported to be rotatable about a fixed shaft 425a. The bent section 425b on the rotating distal end and is bent to a position which extends downwardly to a height which obstructs the carrying path of the cartridge 401 but which does not obstruct the carrying path of the disk 400. 426 is a disk position release pin which is fixed on the disk position release arm 425 and which extends to a height which abuts with the disk position determining arm 415. 427 is a pressing means which is compressed so that the disk position releasing arm 425 is rotated in the direction of the arrow 425A. The disk position releasing arm 425 is held by the compression means 427 against the edge of the hole 1126 in which the disk position releasing pin 426 is fixed. The disk position determining arm 415 is secured to a fixed position abutting against the disk position release pin 426 by the pressure of the compression means 417. When a carried disk 400 abuts with and is stopped by the disk position determining pin 416, recording and playing of the disk 400 is performed in that position by the head 310.

The operation of the conventional disk device will now be explained.

When a disk 400 is inserted into this disk device, the disk 400 is tightly gripped between the first roller 410 and the first guide face 411 by the first contacting means 412. The disk 400 is carried to a fixed position in the disk device by the rotations of a first roller 410. When a cartridge 401 is inserted, the cartridge 401 is tightly gripped between the second roller 420 and the second guide face 421 by the second contacting means 422. The cartridge 401 is carried to a fixed position in the disk device by the rotations of a second roller 420. In particular, while the disk 400 is carried, the second roller 420 and the second guide face 421 are removed from the disk carrying path. In the same way, while a cartridge 401 is being carried, the first roller 410 and the first guide face 411 are removed from the cartridge carrying path.

Since a conventional disk device is constructed as above, both first and second rollers are necessary to respectively carry a disk and a cartridge. Therefore, problems have arisen regarding increases in the complexity of the structure and reduced reliability.

SUMMARY OF THE INVENTION

The present invention is proposed to solve the above problems and has the object of providing a disk device with improved reliability and a simplified structure which can be used with any information recording media which is used by storage in a cartridge such as an MD or an information recording media which is used as a single disk such as a CD.

The disk device of the present invention comprises a circular disk carrying device which has a carrying roller for performing the loading and ejection of a circular disk, and a cartridge carrying device which is provided with a holder for supporting a cartridge, said cartridge carrying device loading a disk storing cartridge when the cartridge is inserted in the holder by the displacement of a carrying arm which comprises one part of a linking structure, which places a loaded disk stored in a cartridge on a turntable and which ejects a disk stored in a cartridge from a turntable.

In this way, it is possible to use circular disks or disk storing cartridges of differing sizes and to perform the loading and ejection of the respective disks with a relatively simple structure and with high reliability.

The disk device of the present invention has a CD guide which guides a circular disk which is carried by a carrying roller from its upper side and in which an MD holder is disposed in a position in which it forms part of said CD guide.

In this way, it is possible to integrate the MD holder and the CD guide and reduce the width of the device.

A disk device according to the present invention disposes an MD holder in a central section of the CD guide and divides the CD guide on both sides of the MD holder.

In this way, it is possible to integrate the MD holder and the CD guide and reduce the width of the device.

In a disk device according to the present invention, the lower face of an MD holder is adapted to act as part of a CD guide when a CD is carried.

In this way, the carrying of a circular disk may be stabilized and it is possible to effectively avoid accidents which damage the disk.

A disk device according to the present invention comprises an MD insertion mouth screen, into which a cartridge which stores a circular disk is inserted and which acts as a displaceable base for an MD insertion mouth for inserting a disk into an MD holder, and an MD holder aperture enlarging mechanism which enlarges the MD holder aperture into which a cartridge is inserted by the force which acts on the MD insertion mouth screen when the screen is rotated by the insertion of a cartridge.

As a result, the insertion of circular disks stored in a cartridge such as an MD into the MD holder is facilitated and user-friendliness is improved.

The disk device of the present invention allows the aperture of the MD holder to be enlarged as the MD holder aperture enlargement mechanism displaces downwardly by rotating the lower face of the aperture of the MD holder.

This arrangement facilitates the insertion of a disk stored in a cartridge such as an MD into an MD holder and increases user-friendliness.

DETAILED DESCRIPTION OF THE PREFERRED EMBODIMENTS

In order to explain the invention in greater detail, the preferred embodiments will be explained below with reference to the accompanying figures. Embodiment 1

Figure 1:
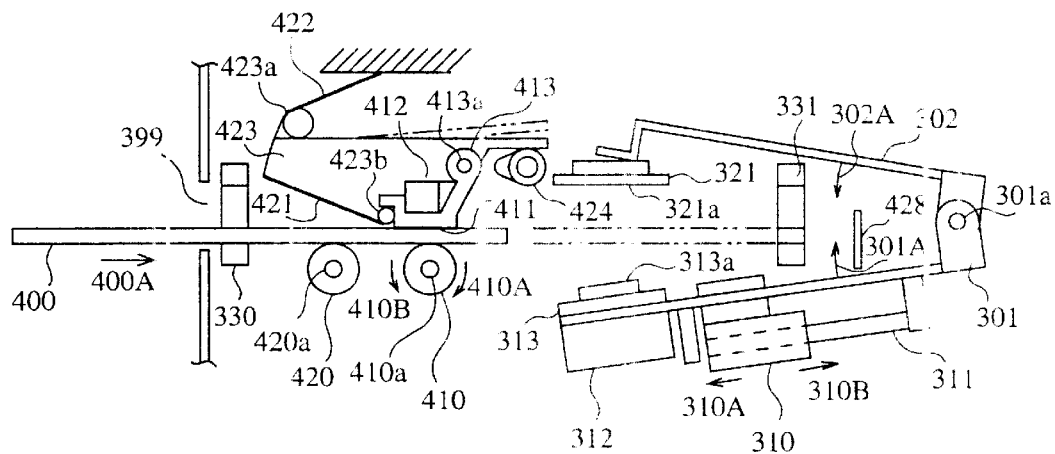
FIG. 1 is a schematic lateral figure of a conventional loading device as disclosed in JP-A-8-87796.
Figure 2:
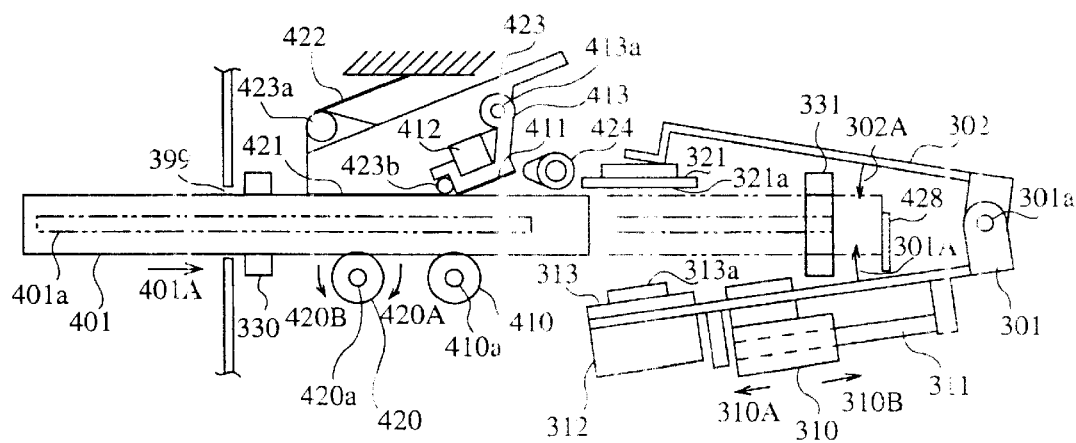
FIG. 2 s a schematic lateral figure of a conventional loading device as disclosed in JP-A-8-87796.
Figure 3:
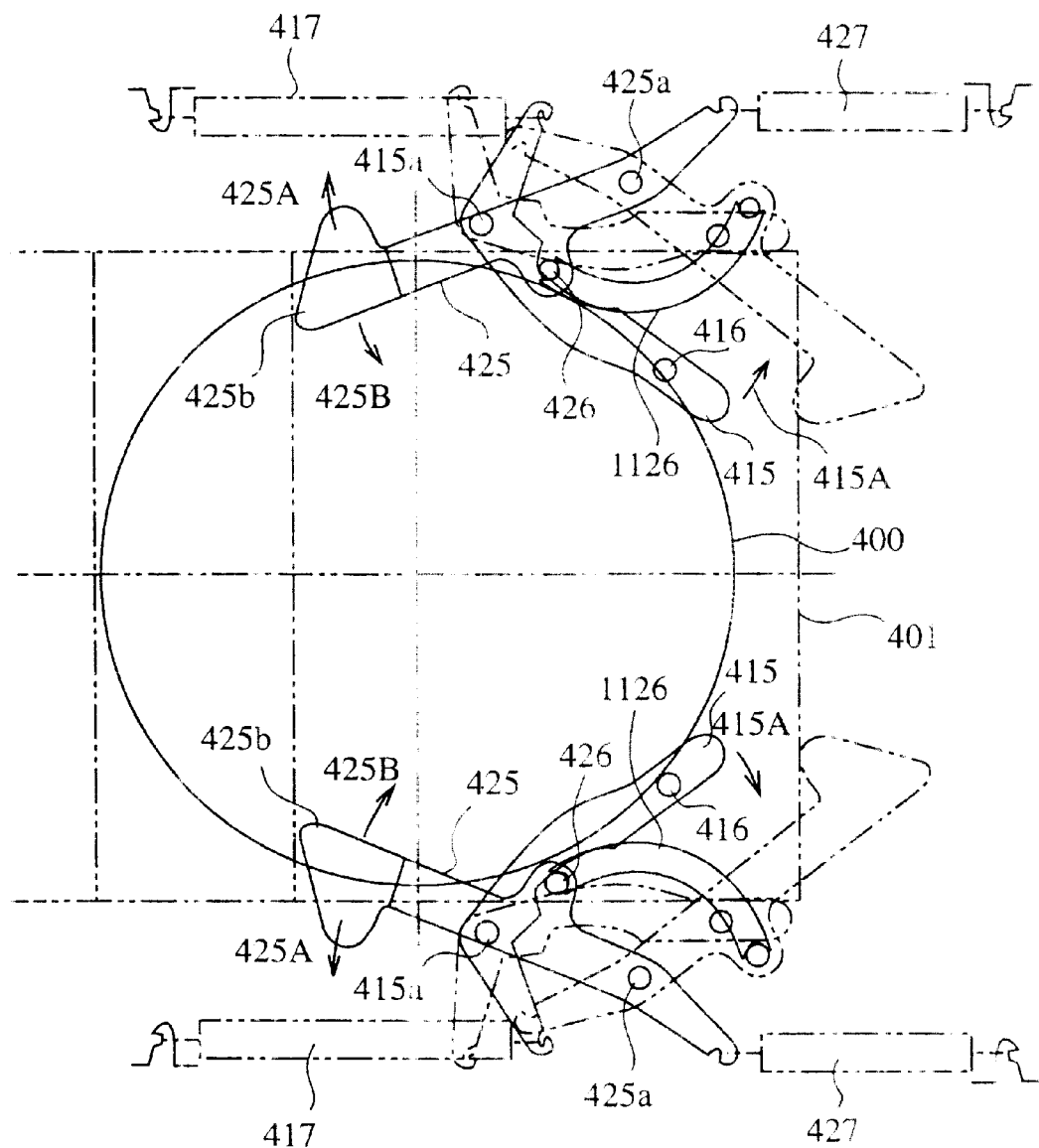
FIG. 3 s a schematic plan figure of a conventional loading device as disclosed in JP-A-8-87796.
Figure 4:
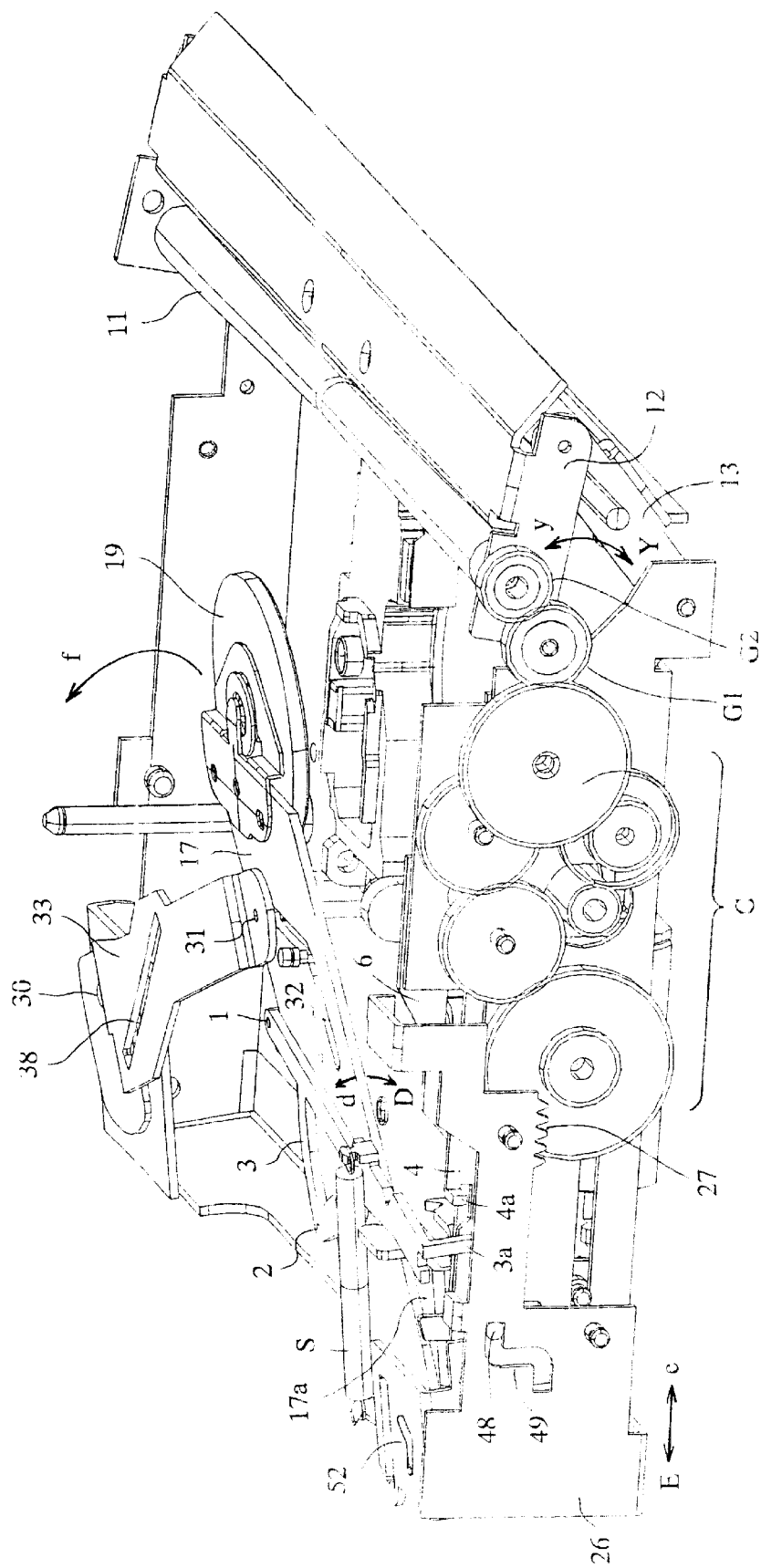
FIG. 4 is a three-dimensional representation of a disk device according to a first embodiment of the present invention.
Figure 5:
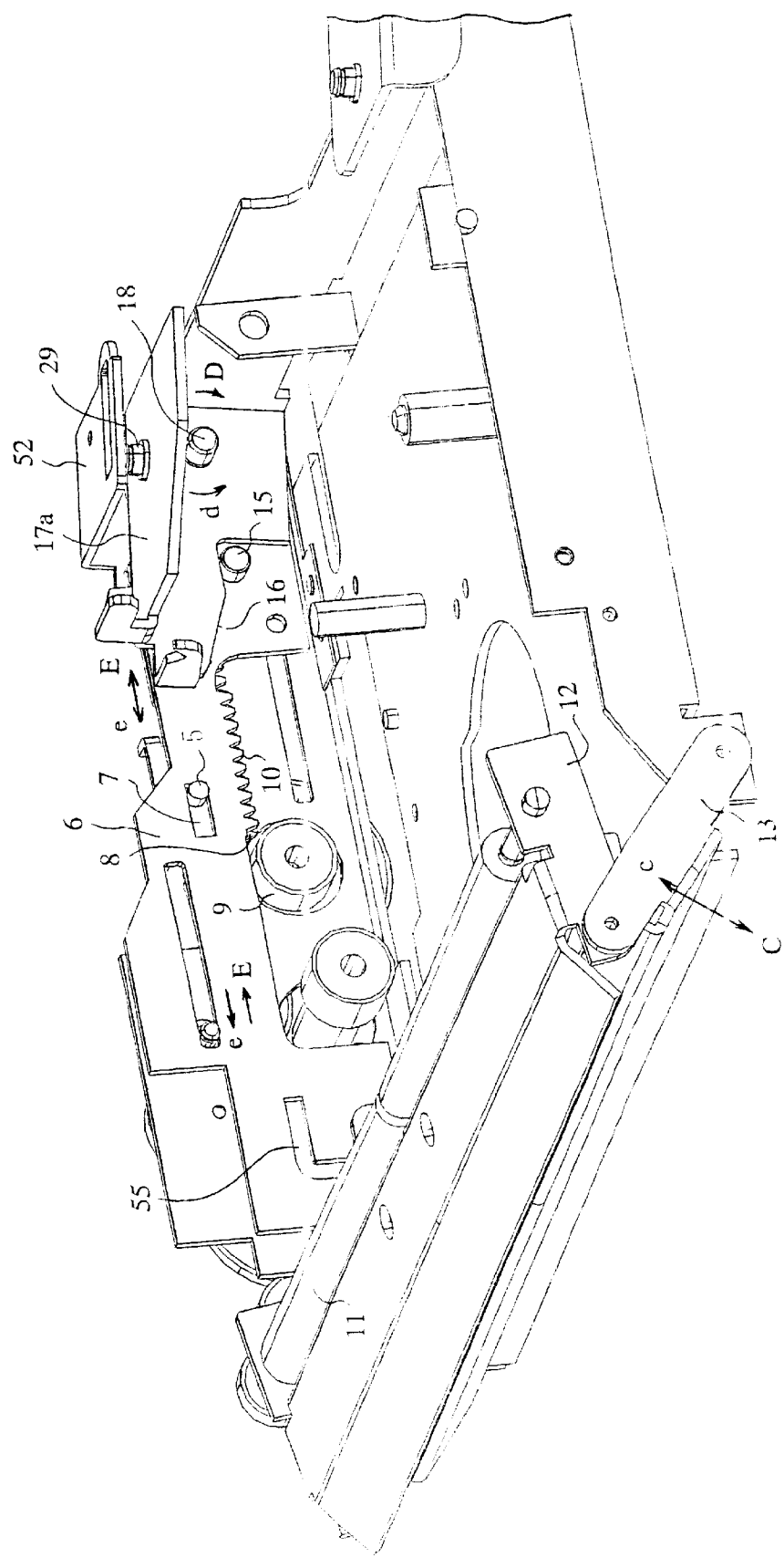
FIG. 5 is a three-dimensional representation of a disk device according to a first embodiment of the present invention excluding internal components.

FIG. 4 is a three-dimensional view of a disk device according to a first embodiment of the present invention. FIG. 5 is a view of the disk device in FIG. 4 excluding internal components. In the figures, reference numeral 1 denotes a small diameter disk abutting pin which abuts with the outer periphery of a small diameter disk when the inserted disk is an 8 cm CD (hereafter called a small diameter disk). 2 is a large diameter disk abutting pin which abuts with the outer periphery of a large diameter disk when the inserted disk is an 12 cm CD (hereafter called a large diameter disk).

3 is a lever which has a small diameter disk abutting pin 1 and a large diameter disk abutting pin 2 and which is rotatable about a supporting point 3b (not shown). 3a is an engaging piece which is arranged on one end of the lever 3.

4 is a first sliding plate arranged on an engaging piece 4a. The first sliding plate 4 is adapted to be slidable in the directions of the arrow e and E. A rack 8 is formed on the first sliding plate 4 as shown in FIG. 5 and is adapted so as to engage with a gear 9 which slides in the direction of the arrow e. A pin 5 is arranged on the first sliding plate 4 as shown in FIG. 5 and is adapted to engage with the slit 7 of the second sliding plate 6.

6 is a second sliding plate which is adapted to slide in the directions of the arrow e and E. A rack 10 is formed on the second sliding plate 6 as shown in FIG. 5 and is adapted so as to engage with a gear 9 which slides in the direction of the arrow e. A pin 15, a pin (not shown), the slit 7 above and an S-shaped elongated hole are arranged on the second sliding plate 6.

Figure 11:
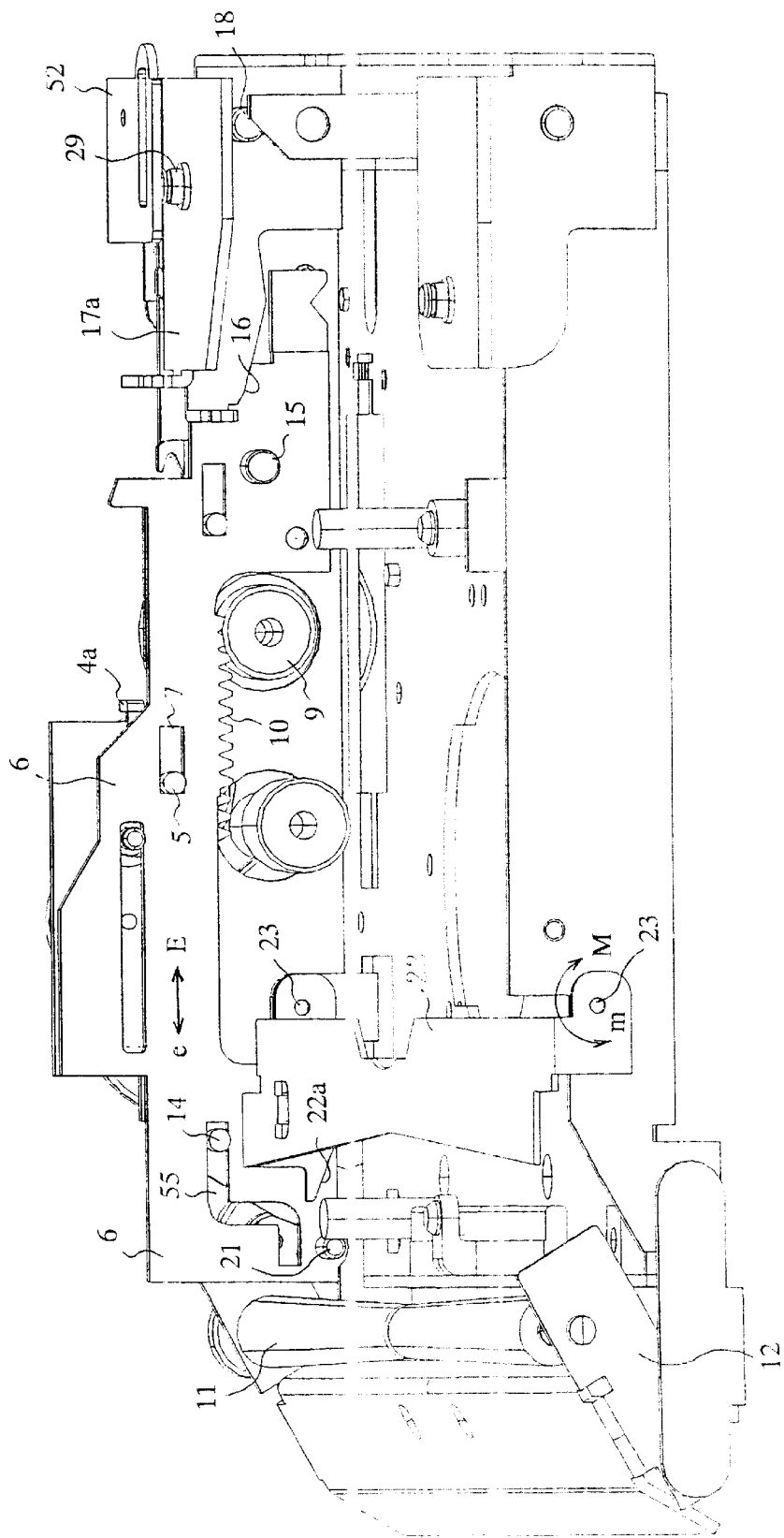
FIG. 11 is a three-dimensional representation of the mechanism to prevent the protruding abutment of a carrying roller with the edge of a small diameter disk in a disk device according to a first embodiment of the present invention.

The gear unit is designated by the symbol G in FIGS. 4 and 11 is a carrying roller. The carrying roller 11 is adapted to rotate bi-directionally depending on the insertion or ejection of a minidisk (hereafter MD) which is stored in a cartridge, a large diameter disk and a small diameter disk by the transmission of the rotations of a drive motor (not shown) through a gear unit G. For this purpose, a gear G2 is fixed to one end of a shaft of the carrying roller 11. The gear G2 engages with a gear G1 which is one of the gears which form the gear unit G.

12 is a carrying roller support lever which supports the carrying roller 11 to be rotable at both ends and which is axially supported in free rotation by the common rotation shaft of the gear G1 which comprises the gear unit G.

Figure 10:
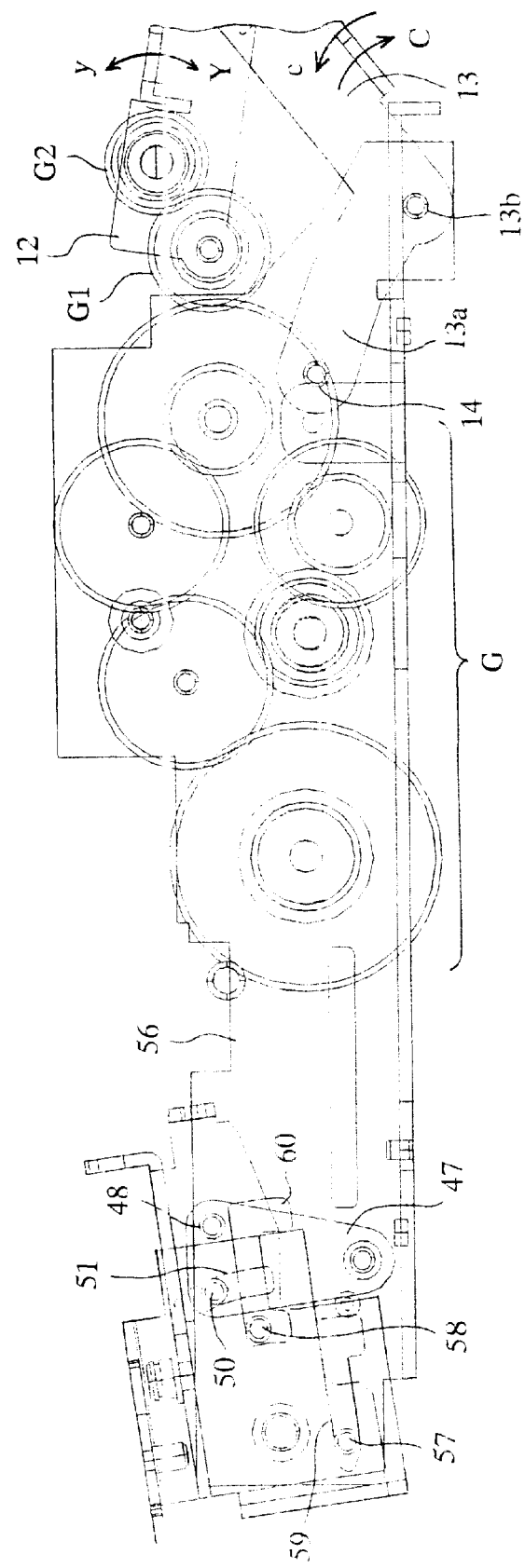
FIG. 10 is a lateral view of a disk device according to a first embodiment of the present invention.

13 is a lifting arm which rotates the carrying roller support lever 12 in the directions y and Y of the arrow and which raises the carrying roller 11 in the vertical direction. The lifting arm 13 has an L-shaped extension 13a which comprises a pin 14 as shown in FIG. 10 and is adapted to rotate about the shaft 13b in the direction of the arrows C and c. The pin 14 comprised by the extension 13a engages with an S-shaped elongated hole 55 on the second sliding plate as shown in FIG. 5.

In FIG. 4, 17 is a clamp lever which is provided with a clamp 19 on the distal end. The clamp lever 17 is adapted to rotate about the rotation shaft 29 as shown in FIG. 5 in the direction f. An L-shaped elongated hole 32 is formed on the clamp lever 17.

17a is a clamp lever support member which is provided with a rotating shaft 29 as shown in FIG. 5 to support the clamp lever 17 so that the clamp lever 17 is rotatable in the direction f shown in FIG. 4. The clamp lever supporting member 17a is adapted to rotate in directions D and d about the rotation shaft 18 as shown in FIG. 5. A cam face 16 which engages with the pin 15 is formed on the clamp lever support member 17a.

26 is a third sliding plate 16. A rack 27 and an S-shaped elongated hole 49 are formed on the third sliding plate 26. The third sliding plate 16 is adapted to slide in the directions e and E.

33 is a linked lever on which an elongated hole 38 is formed and which is adapted to rotate about a shaft 30 which acts as the center of rotation. An engaging pin 31 and an L-shaped elongated hole 32 of the clamp lever 17 are formed on the tip of the linked lever 33.

Figure 6:
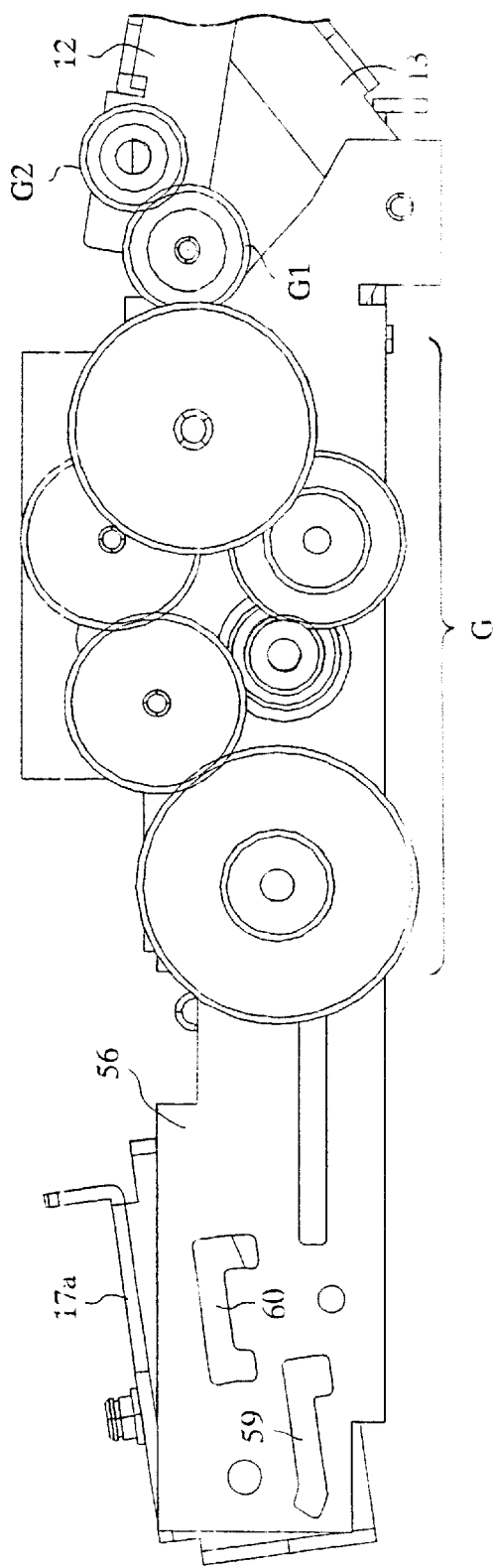
FIG. 6 is a lateral view of a disk device according to a first embodiment of the present invention seen from the gear unit side with the third sliding plate removed.

FIG. 6 is a lateral view of the disk device shown in FIG. 4 with the third sliding plate 26 removed as seen from the gear unit G side. The relay member 47 is omitted from the lateral view. In the figure, 56 is a mounting plate such for a gear unit G and 59 and 60 are elongated holes.

Figure 8:
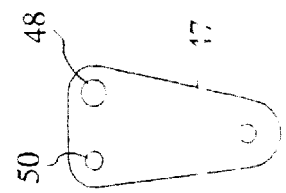
FIG. 8 is a component view of an intermediate member according to a first embodiment of the present invention.

48 is a pin which is arranged on the relay member 47 as shown in FIG. 8 and which engages with the S-shaped elongated hole 49.

Figure 7:
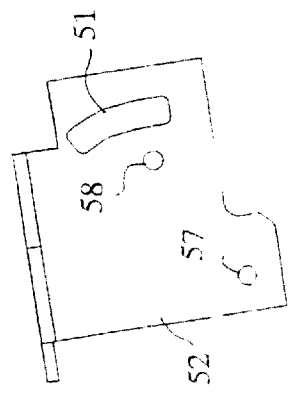
FIG. 7 is a component view of an intermediate member according to a first embodiment of the present invention.

52 is an intermediate member shown in FIG. 7 on which an arc shaped elongated hole 51 and pins 57 and 58 are formed.

Figure 9:
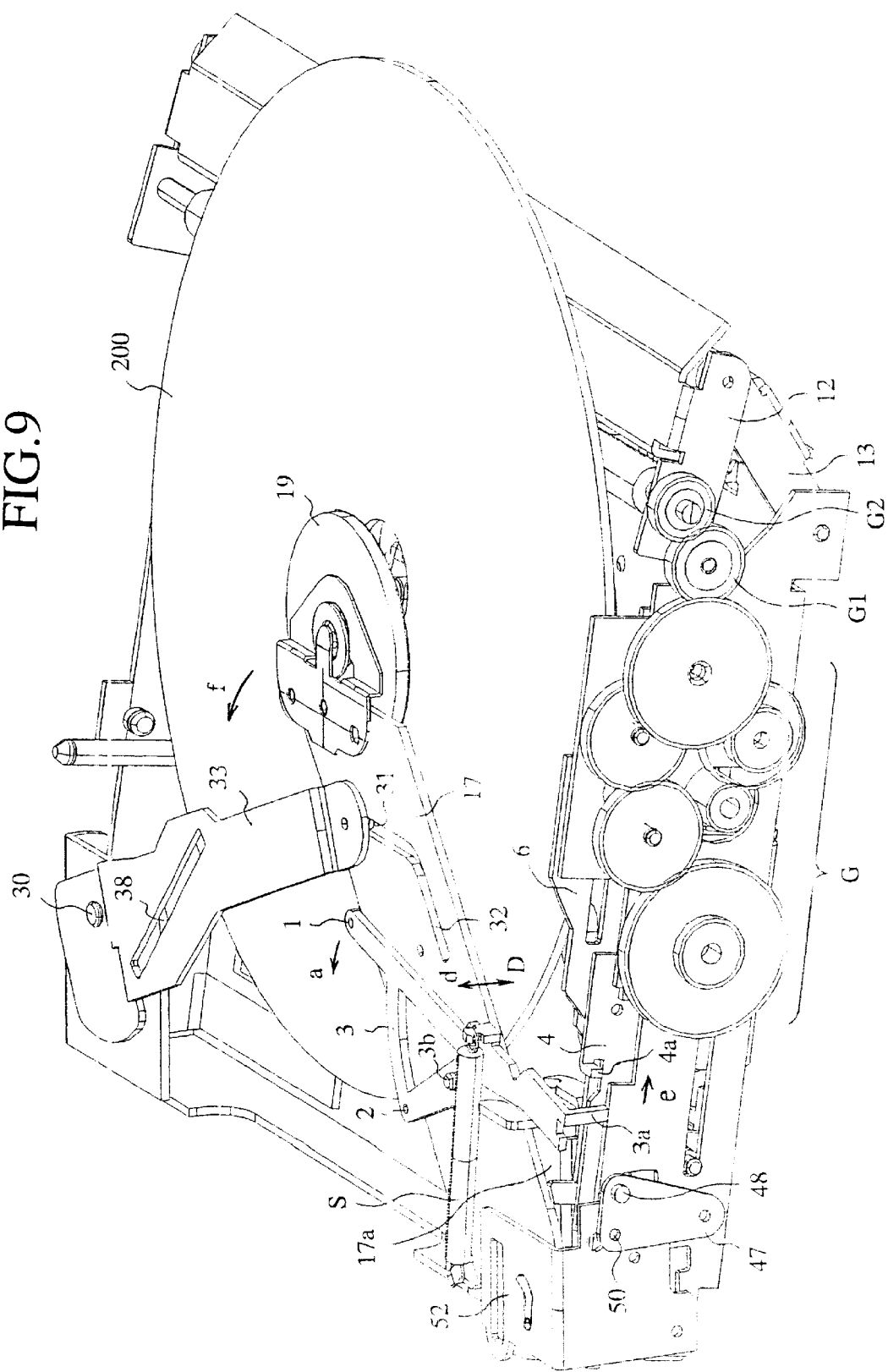
FIG. 9 is a three-dimensional representation of the insertion of a large diameter disk into a disk device according to a first embodiment of the present invention.

FIG. 9 is a three-dimensional figure of the insertion of a large diameter disk in a disk device according to a first embodiment of the present invention. The same or similar components to those of FIG. 4 are represented by the same numerals in FIG. 9 and their explanation will be omitted. FIG. 9 omits the third sliding plate 26 shown in FIG. 4 so as to clarify the relay member 47 which is disposed on the rear side of the third sliding plate 26. In the figure, 200 is a large diameter disk, S is a spring which compresses the tip, on which the small diameter abutting pin 1 of the lever 3 is formed, in a clockwise direction about the supporting point 3b.

FIG. 10 is a lateral view of the arrangement of a disk device according to a first embodiment of the invention.

FIG. 11 is a three-dimensional representation of the arrangement to prevent the carrying roller 11 from projecting and abutting with the edge of a small diameter disk by raising the peripheral section on the carrying roller abutting side of a small diameter disk, when the carrying roller 11 abuts with the rear surface of the small diameter disk and carrys the small diameter disk. In the figure, 21 is a pin which is provided on a second sliding plate 6. 22 is a CD raising lever. A cam face 22a is provided on the CD raising lever 22. The CD raising lever 22 is adapted to rotate in the directions M and m about the shaft 23 due to the abutment of the pin 21 with the cam face 22a.

Figure 12:
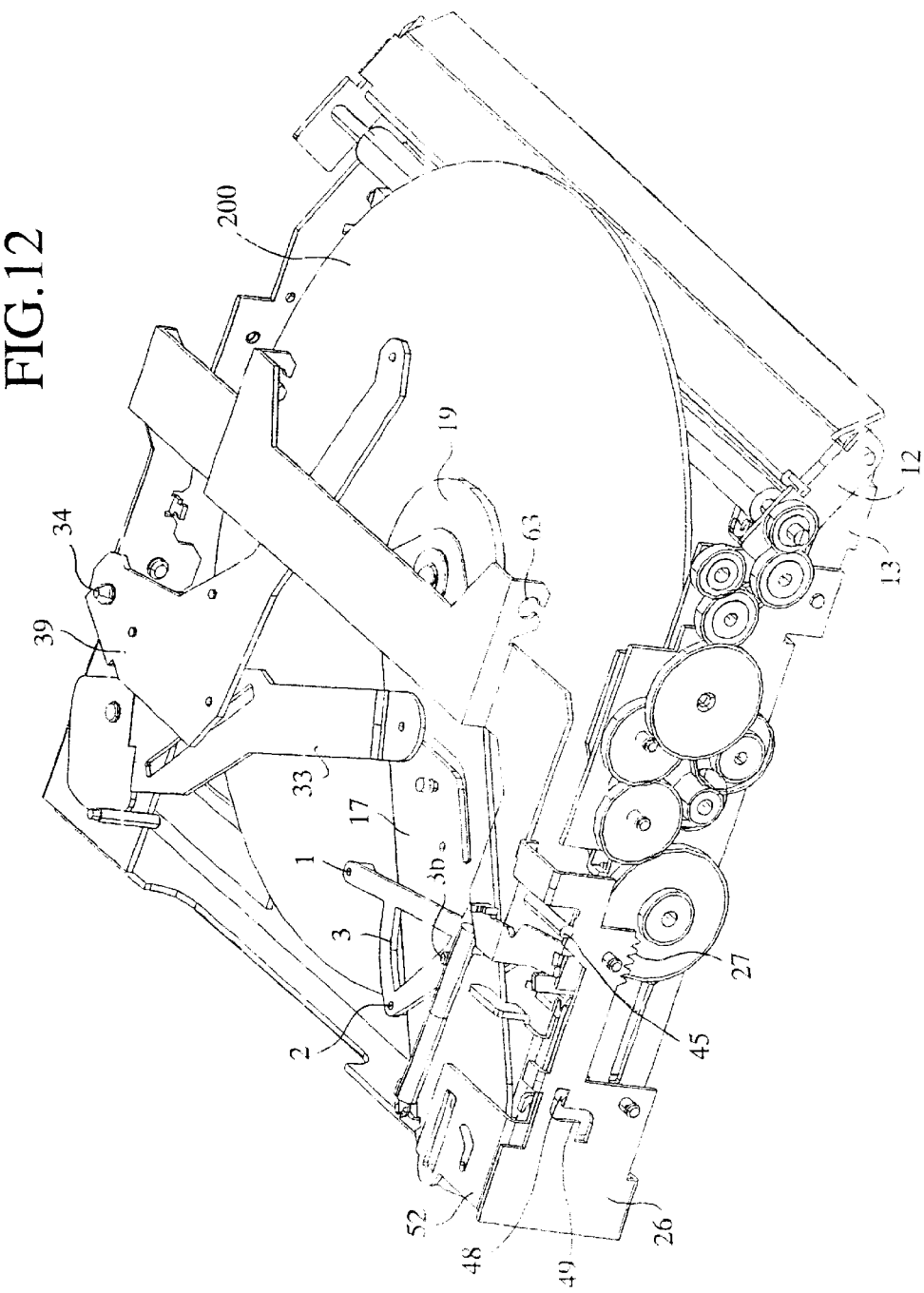
FIG. 12 is a three-dimensional representation of the mechanism to carry the center of a large diameter disk to a turntable according to a first embodiment of the present invention.

FIG. 12 shows a three-dimensional representation of a disk device according to a first embodiment of the invention wherein the center of a CD (large diameter disk) is carried to a turntable.

Figure 13:
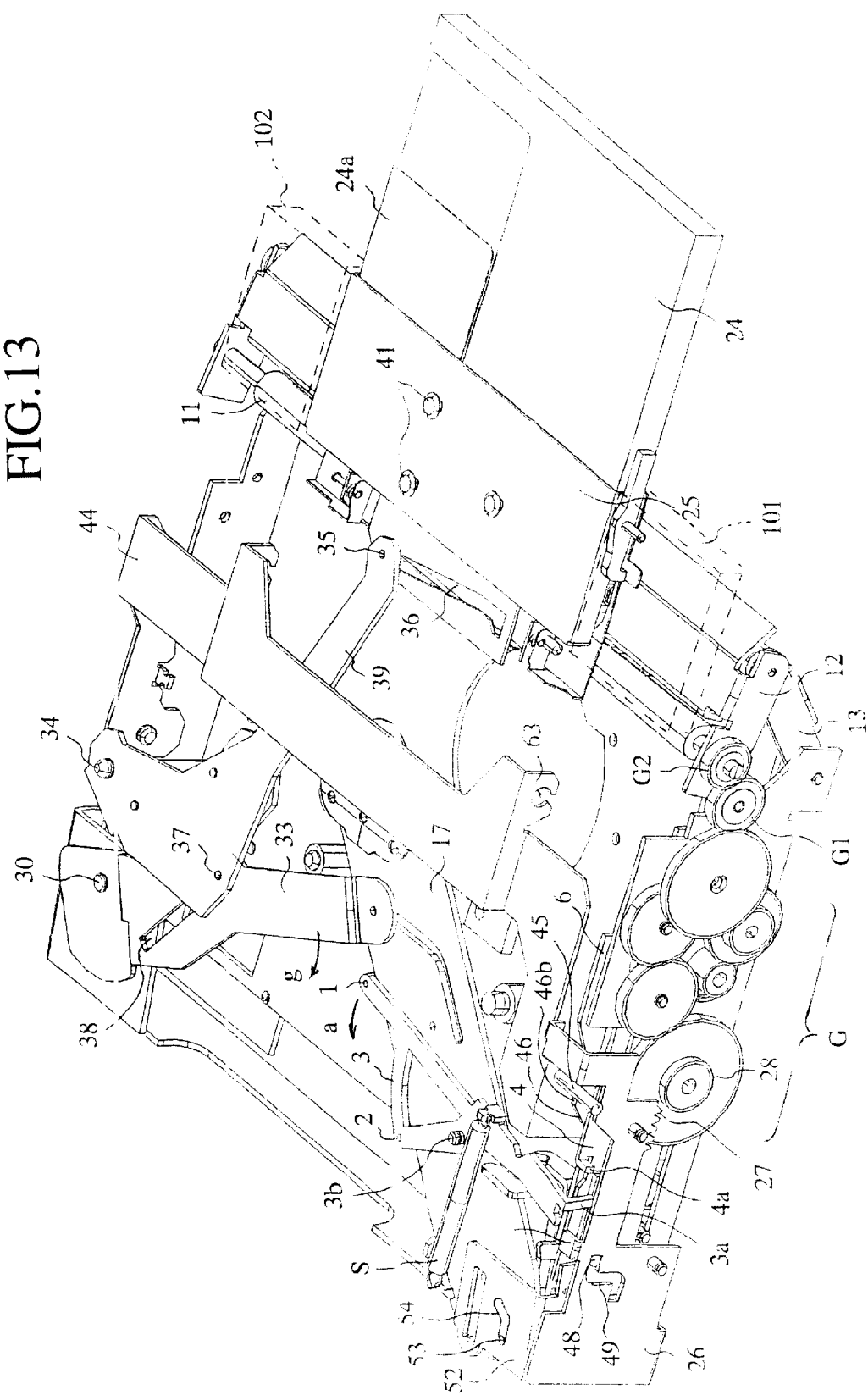
FIG. 13 is a three-dimensional representation of an arrangement which adds a member which functions when an MD is loaded in a disk device according to a first embodiment of the present invention.
Figure 16:
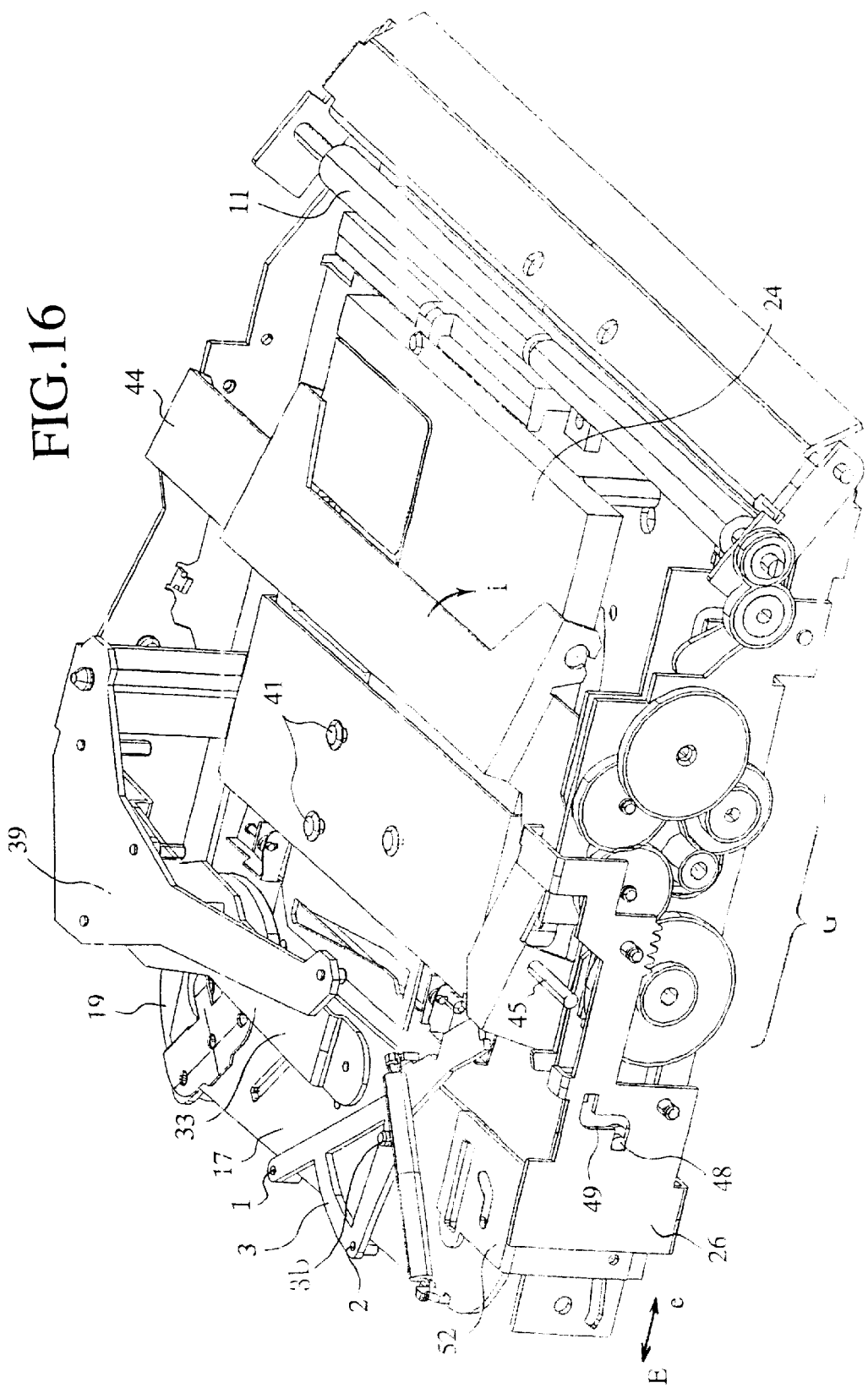
FIG. 16 is a three-dimensional representation of the state when an MD is played in a disk device according to a first embodiment of the present invention.

FIG. 13 shows a three-dimensional representation of a disk device according to a first embodiment of the invention wherein a member, which functions when an MD is loaded, is added. In FIG. 13, the same or similar components as in FIG. 4 are represented by the same numerals and their explanation will be omitted. In the figure, 24 is an MD, 24a is a slide cover for exposing a disk stored in a cartridge, 25 is an upper MD holder, 300 is a lower MD holder and CD disk guide (refer to FIG. 25), 36 is an elongated hole which is formed in the MD holder, 39 is a holder drawing lever, 34 is a shaft which acts as a center when the holder drawing lever 39 rotates, 35 is a pin which engages with an elongated hole 36, and which is formed in proximity to the tip of the holder drawing lever 39. 37 is a pin which engages with the elongated hole 38 and which is formed near the center of the holder drawing lever 39. 44 is an MD holder supporting member, 63 is a bearing for supporting the holding and guiding member 61 of the MD holder 25 (FIG. 14) so as to be rotatable. 41 is a guide pin which is formed on the MD holder 25. 45 is a pin which is provided on the lateral face of the MD holder supported member 44 and which is adapted to support the MD holder support member 44 horizontally by running on the upper horizontal face 46b of the cam face 46 of the second sliding plate 6. Furthermore the MD holder support member 44 inclines the MD insertion side downwardly as shown in FIG. 16 when the pin 45 slides downwardly on the cam face 46 of the second sliding plate 6 and separates from the cam face 46.

101 and 102 are CD guides which are disposed on both sides of the MD holder 25 above the carrying roller 11 and which guide the CD from its upper face. 300 is a lower MD holder and CD disk guide, the lower face of which forms a part of the CD guide. When a CD is inserted, the inserted CD is carried into the device by the carrying roller 11 due to the fact that the upper face of the disk is guided by the CD guides 101, 102, and the lower MD holder and CD disk guide 300.

Figure 14:
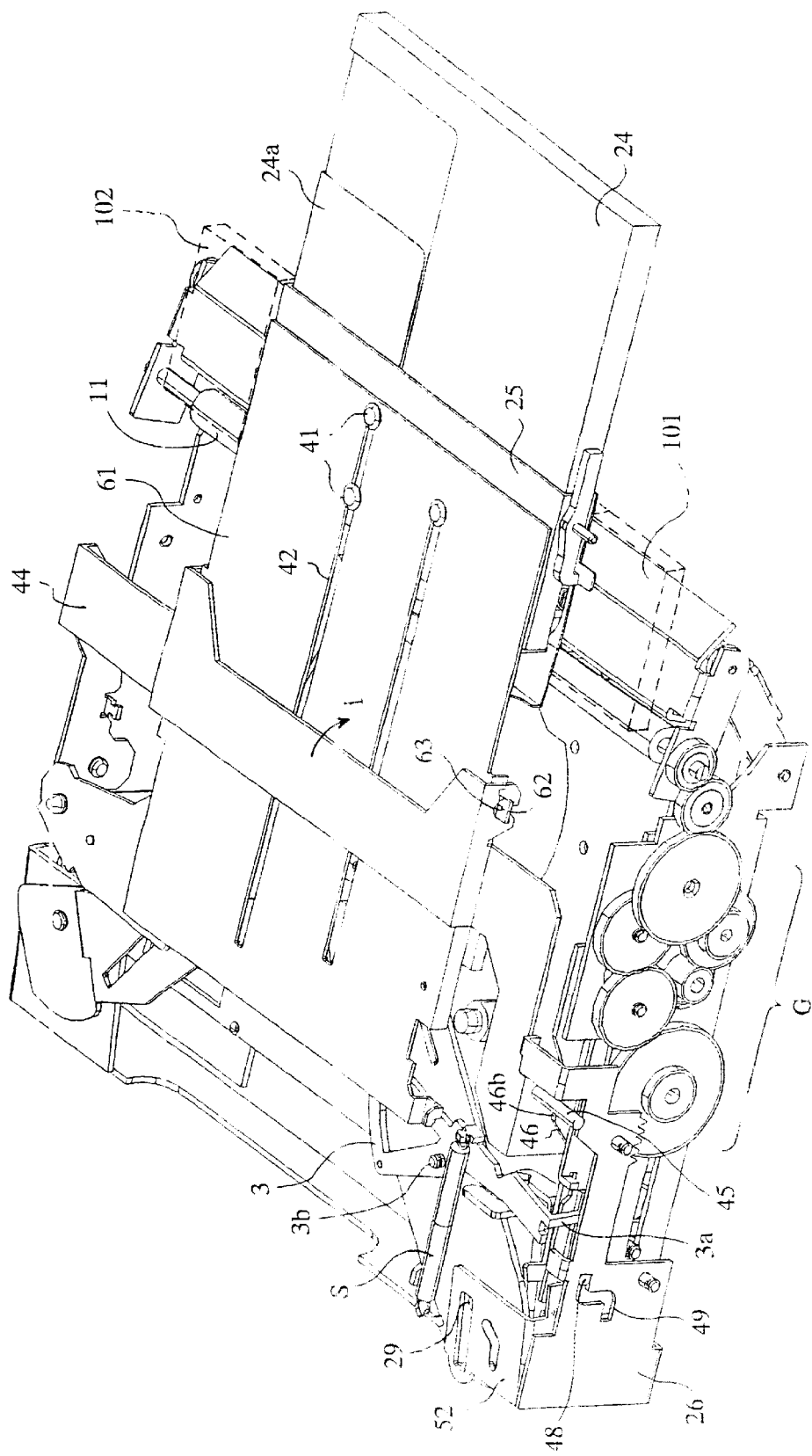
FIG. 14 is a three-dimensional representation of an arrangement which adds a supporting and guiding member in a disk device according to a first embodiment of the present invention.

FIG. 14 is a three-dimensional representation of a disk device according to a first embodiment of the present invention wherein a holding and guiding member 61 is added. In FIG. 14, same or similar components to those in FIG. 13 are denoted by the same numerals and their explanation will be omitted. In the figures, 42 is a guide hole which is formed on the holding and guiding member 61 and which engages with the guide pin 41 to guide the MD holder 25. 62 is a plate shaped shaft which protrudes towards both lateral sections of the holding and guiding member 61. The plate shaped shaft 62 engages with a bearing 63 which is formed on the MD holder supporting member 44.

Figure 15:
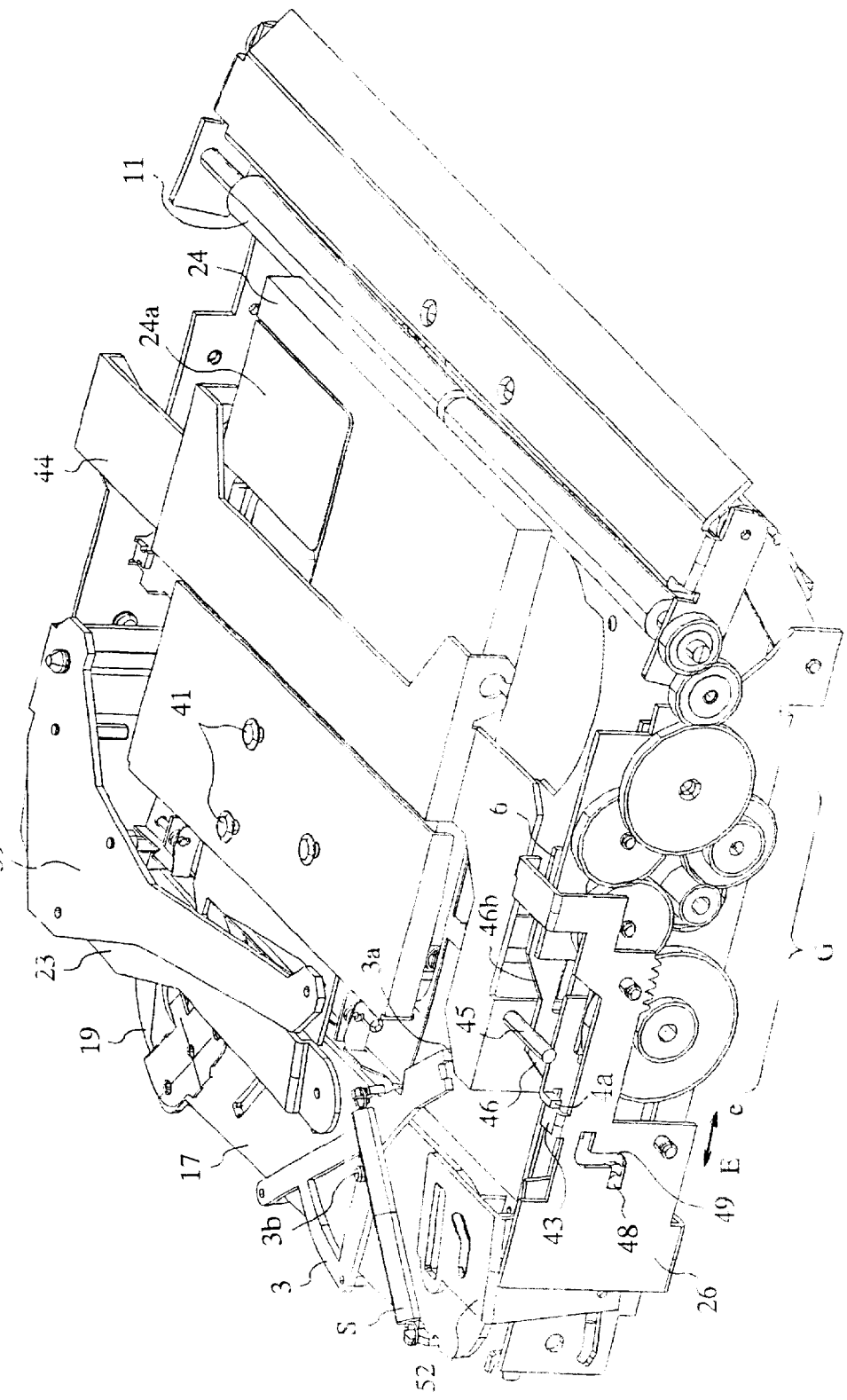
FIG. 15 is a three-dimensional representation of the state in which an MD is carried into a disk device according to a first embodiment of the present invention.

FIG. 15 is a three-dimensional representation of a disk device according to a first embodiment of the invention wherein an MD is carried into the device.

FIG. 16 is a three-dimensional representation of the state when an MD is played in a disk device according to a first embodiment of the present invention.

Figure 17:
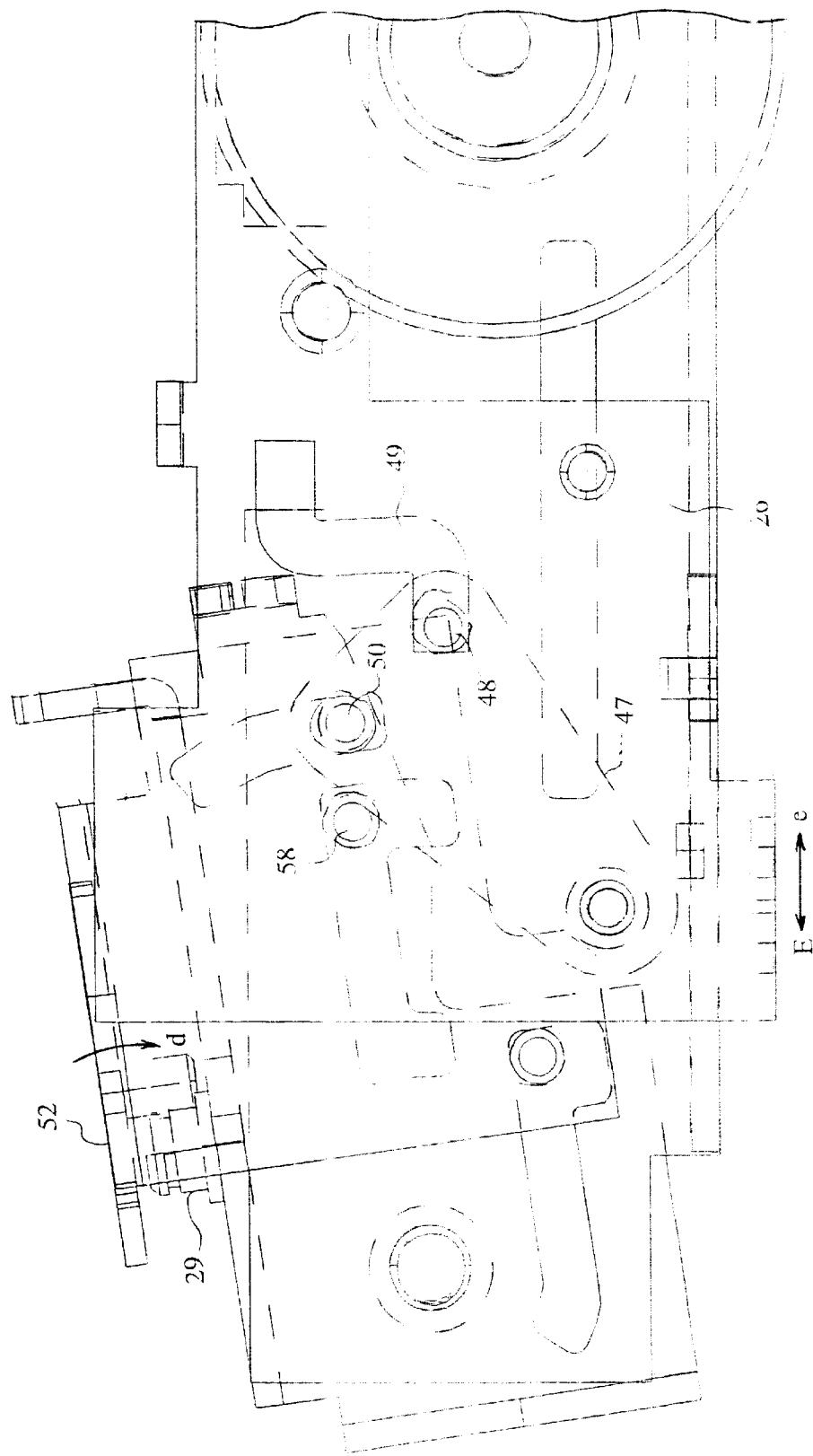
FIG. 17 is a partial lateral view of the displacement of a third sliding plate in the direction of the arrow e in a disk device according to a first embodiment of the present invention.

FIG. 17 is a partial lateral view of the displacement of a third sliding plate 26 in the direction of the arrow e in a disk device according to a first embodiment of the present invention.

Figure 18:
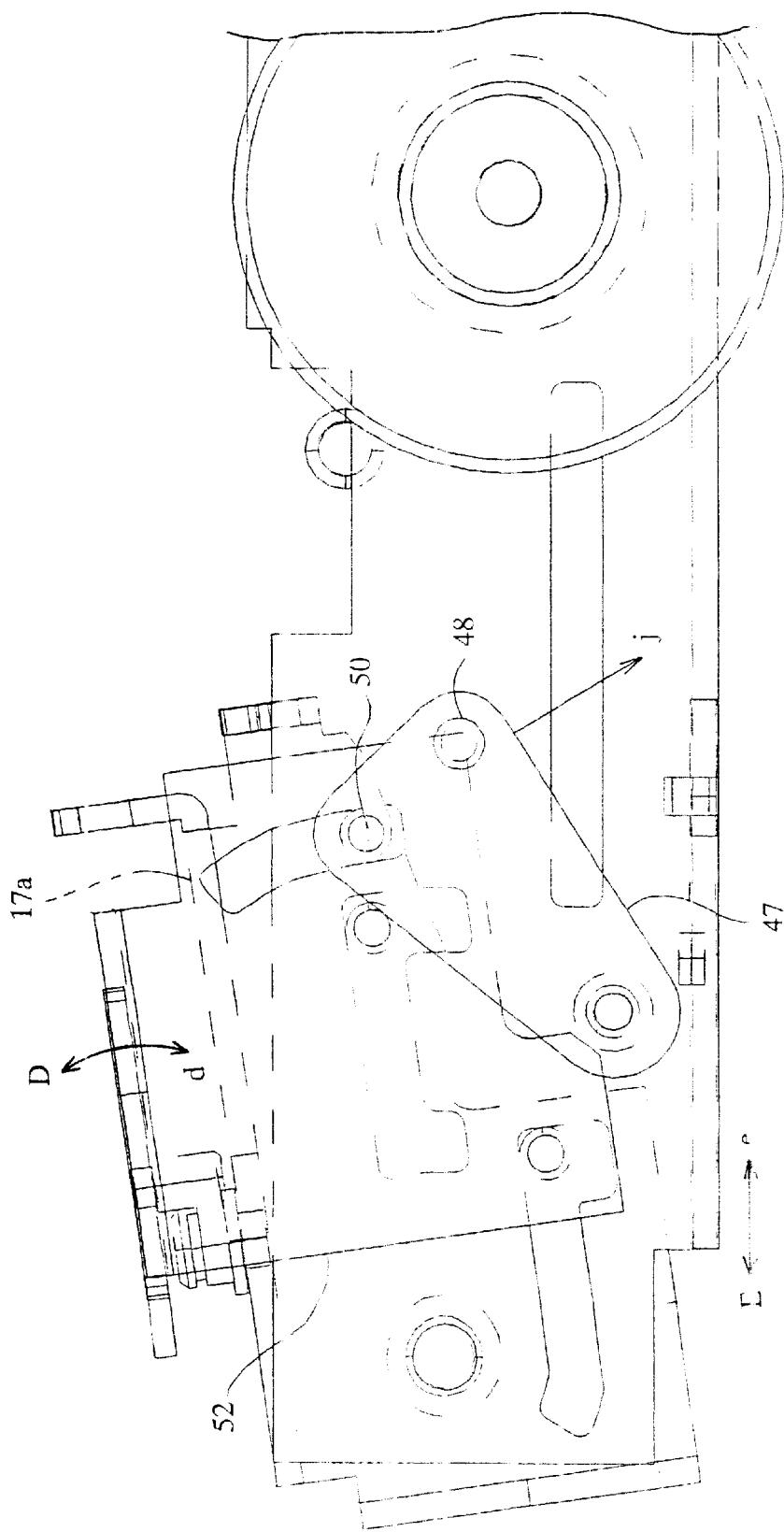
FIG. 18 is a partial lateral view of the displaced position of an intermediate member due to a third sliding plate (not shown) in the direction of the arrow e in a disk device according to a first embodiment of the present invention.

FIG. 18 is a partial lateral view of the displaced position of a intermediate member 52 due to a third sliding plate 26 in the direction of the arrow e in a disk device according to a first embodiment of the present invention.

Figure 19:
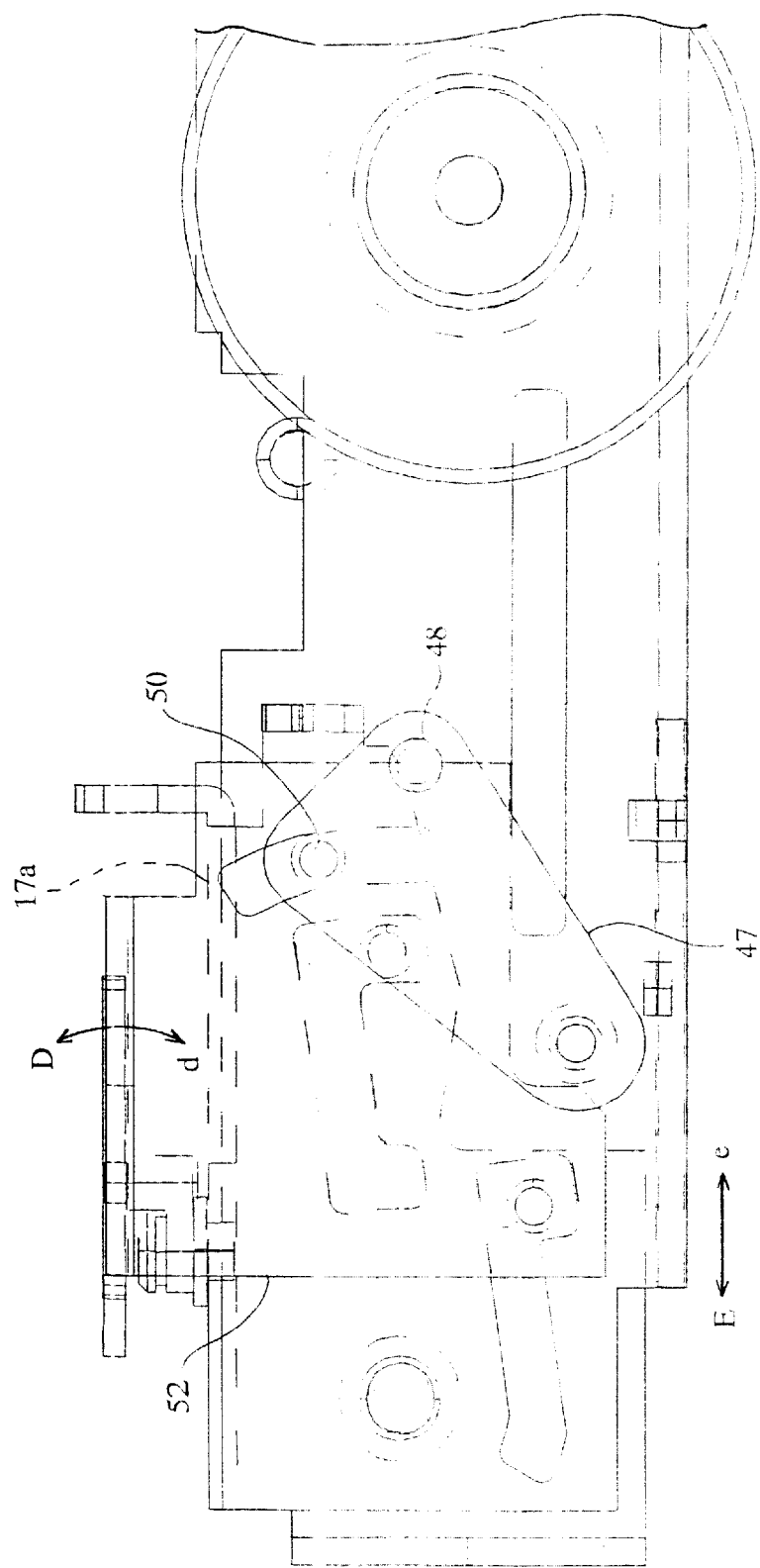
FIG. 19 is a partial lateral view of the rotated position of an intermediate member in the direction of the arrow d in a disk device according to a first embodiment of the present invention.

FIG. 19 is a partial lateral view of the rotated position of a intermediate member 52 in the direction of the arrow d in a disk device according to a first embodiment of the present invention.

Figure 20:
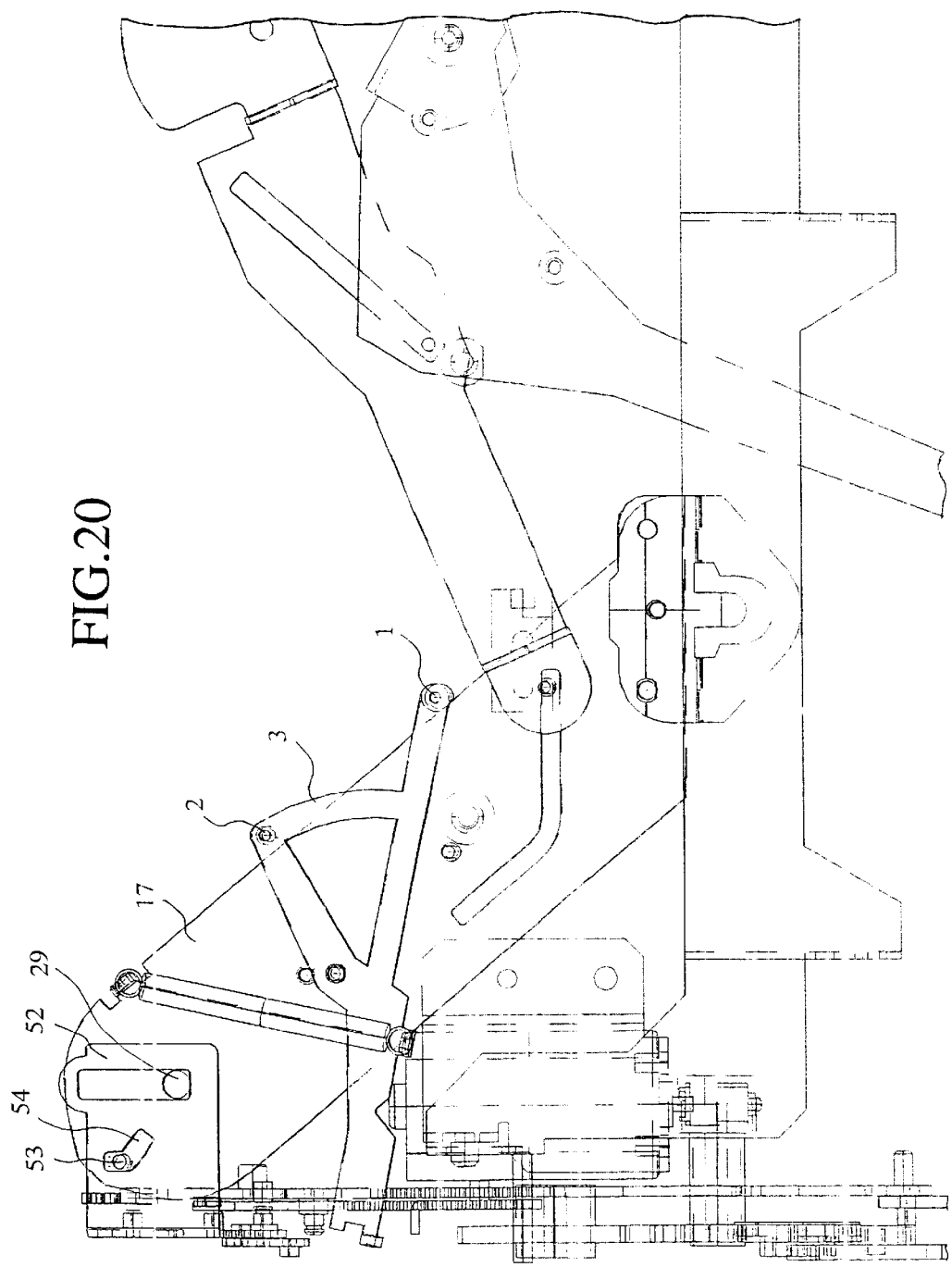
FIG. 20 is a partial lateral view of the mechanism to rotate a clamp lever in the rear direction when an MD is loaded in a disk device according to a first embodiment of the present invention.

FIG. 20 is a partial lateral view of the mechanism of rotating a clamp lever 17 in the rear direction when an MD is loaded in a disk device according to a first embodiment of the present invention.

Figure 21:
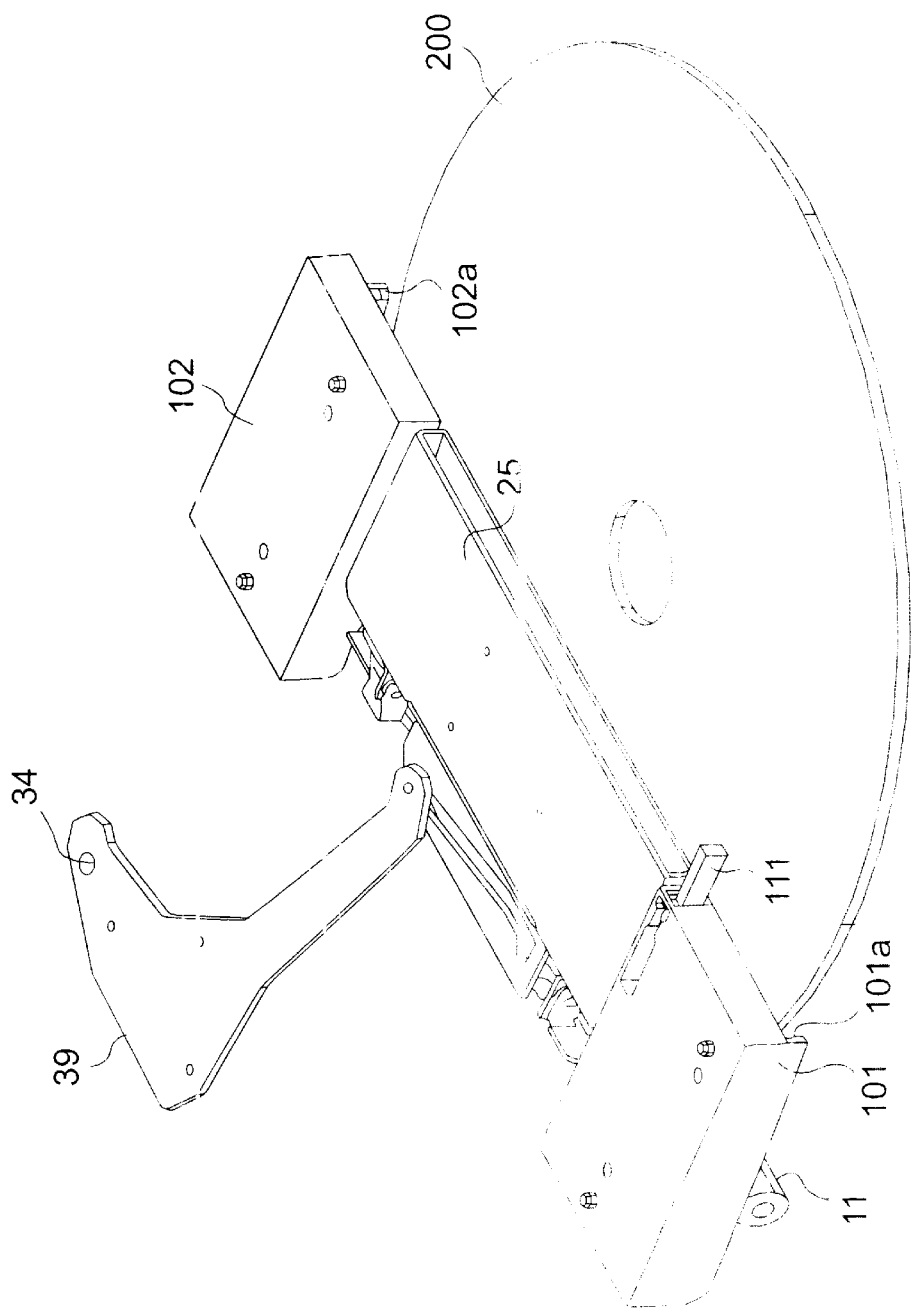
FIG. 21 is a three-dimensional representation of the arrangement of the CD/MD insertion section when a CD is inserted into a disk device according to a first embodiment of the present invention.

FIG. 21 is a three-dimensional representation of the arrangement of the CD/MD insertion section when a CD is inserted into a disk device according to a first embodiment of the present invention. In the figure, 111 is an enlargement lever for enlarging the aperture of the MD holder 25 when an MD is inserted.

Figure 22:
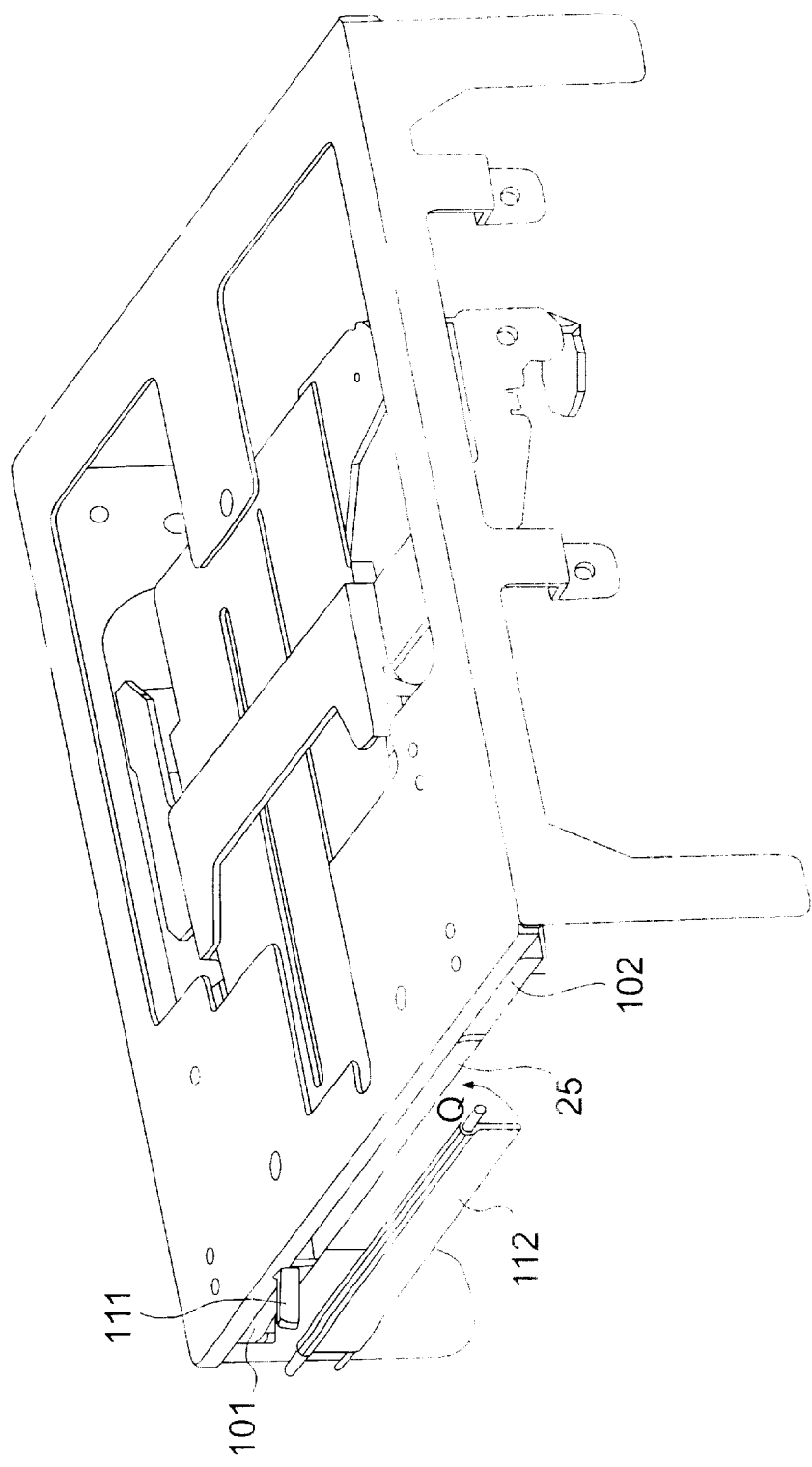
FIG. 22 is a three-dimensional representation of the arrangement of the CD/MD insertion section in a disk device according to a first embodiment of the present invention.

FIG. 22 is a three-dimensional representation of the arrangement of the CD/MD insertion section in a disk device according to a first embodiment of the present invention. In the figure, 112 is an MD insertion mouth screen which covers the MD insertion mouth of the CD/MD insertion section and prevents dust from entering. The MD insertion mouth screen which abuts with an MD which is inserted into the MD insertion mouth and rotates in the direction Q of the arrow. The MD insertion mouth screen 112 abuts with the side of the tip of the inserted MD when an MD is inserted into the CD/MD insertion section. However it is adapted not to abut with an inserted CD.

Figure 23:
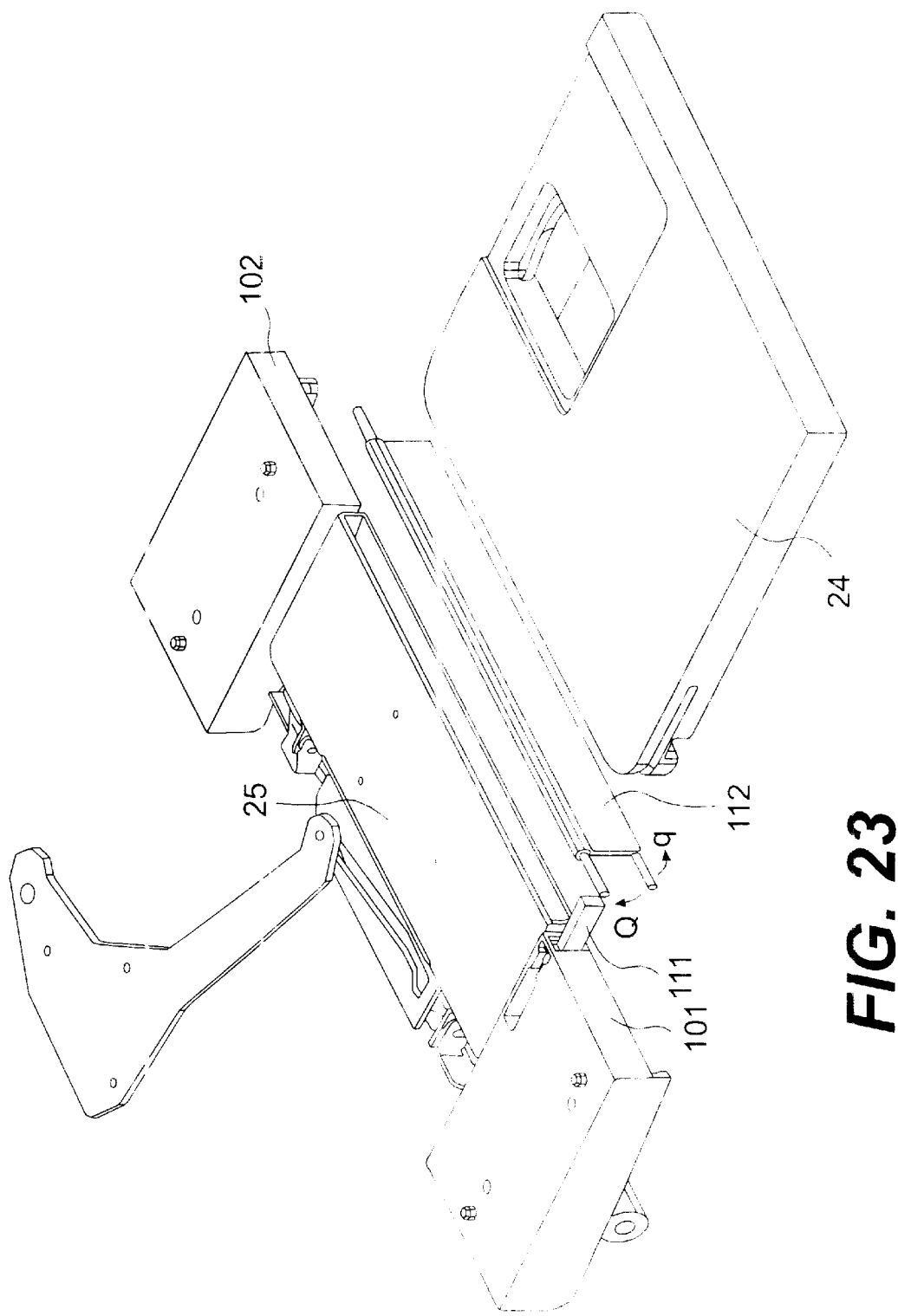
FIG. 23 is a three-dimensional representation of an MD inserted into the insertion mouth of a disk device according to a first embodiment of the present invention.

FIG. 23 is a three-dimensional representation of an MD 24 inserted into the MD insertion mouth.

Figure 24:
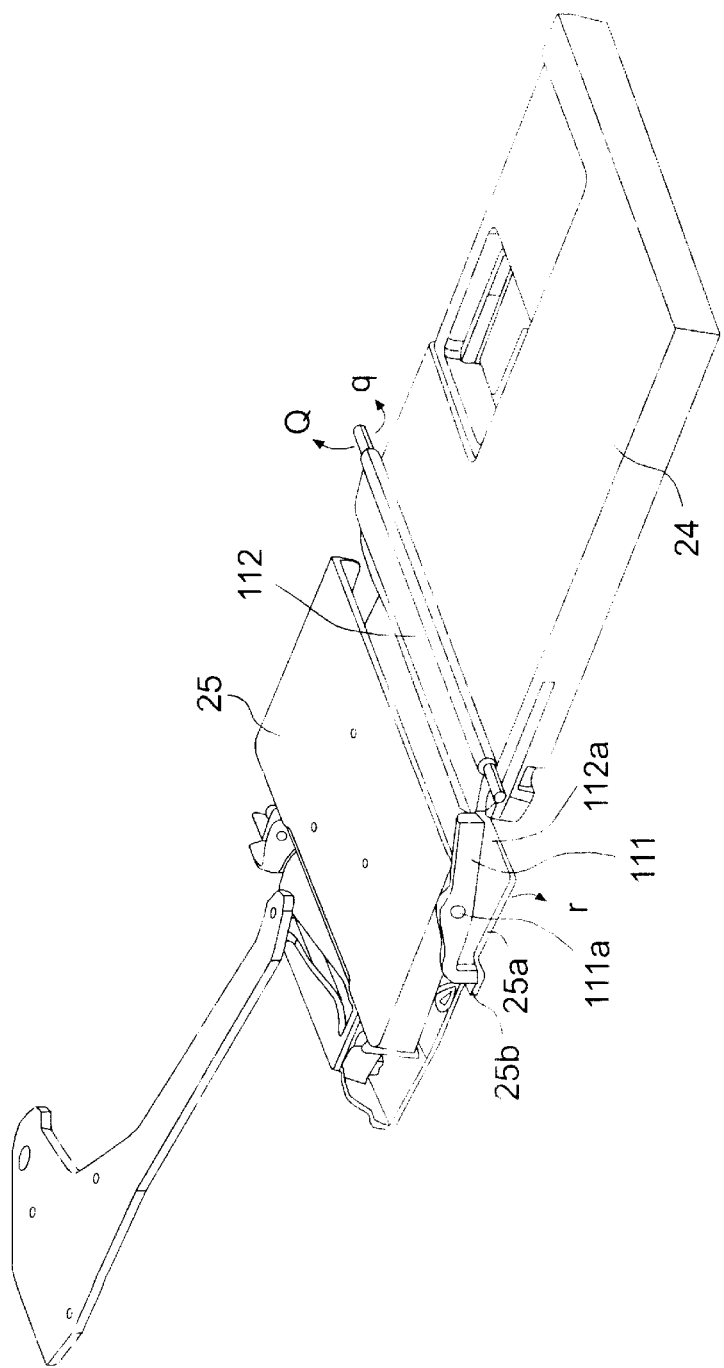
FIG. 24 is a three-dimensional representation of an aperture of an MD holder as enlarged in a disk device according to a first embodiment of the present invention.

FIG. 24 is a three-dimensional representation of a MD insertion mouth screen 112 abutting with an inserted MD from the MD insertion mouth and rotating in the direction Q of the arrow with the aperture of the MD holder 25 enlarged. As shown in the figure, a pin 112a is provided on one side face of the MD insertion mouth screen 112. The MD insertion mouth screen 112 abuts with the side of the tip of the MD 24 which has been inserted from the MD insertion mouth. The pin 112a of the MD insertion mouth screen 112 which has rotated in the direction Q of the arrow raises one end of the enlargement lever 111 upwardly. As a result, the other end of the enlargement lever 111 rotates about the shaft 111a and abuts with the projection 25b of the MD holder aperture member 25a which is displaced on the lower side of the MD holder 25 which comprises the aperture of the MD holder 25. The MD holder aperture member 25a opens in the direction r of the arrow and the aperture of the MD holder 25 is enlarged thus facilitating the insertion of an MD into the aperture of the MD holder 25.

Figure 25:
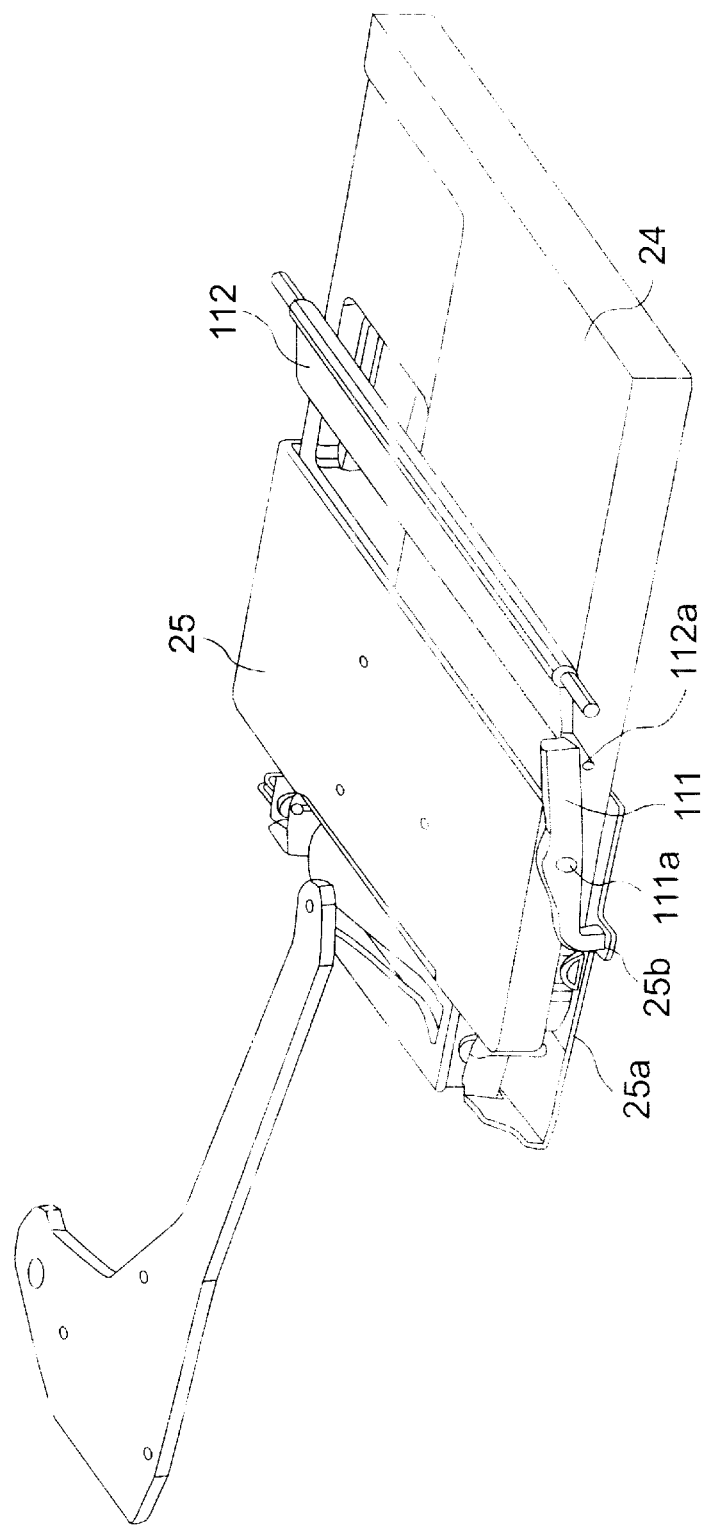
FIG. 25 is a three-dimensional representation of an MD inserted into the aperture of an MD holder enlarged in a disk device according to a first embodiment of the present invention.
Figure 26:
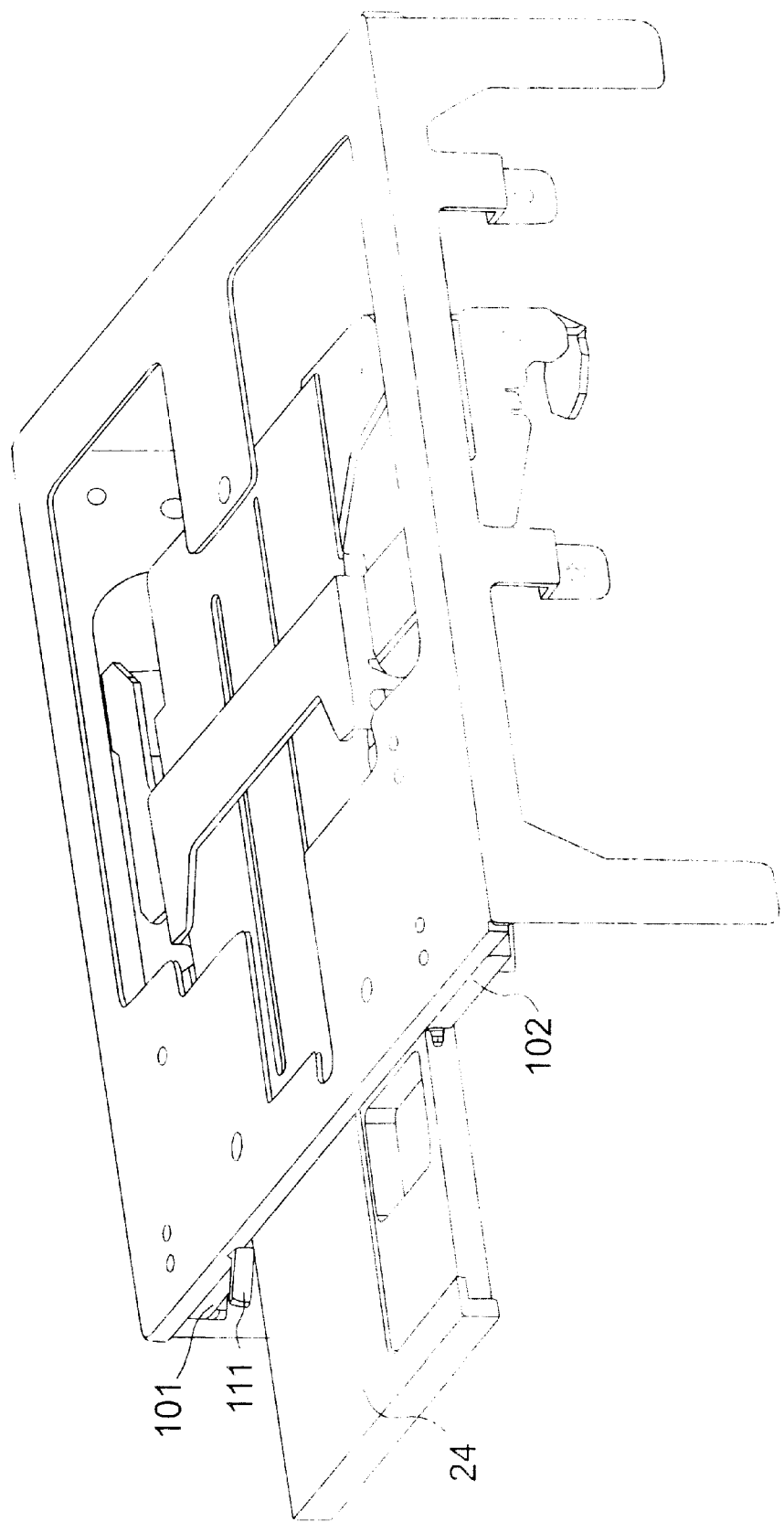
FIG. 26 is a three-dimensional representation of an MD inserted into the aperture of an MD holder enlarged in disk device according to a first embodiment of the present invention.
Figure 27:
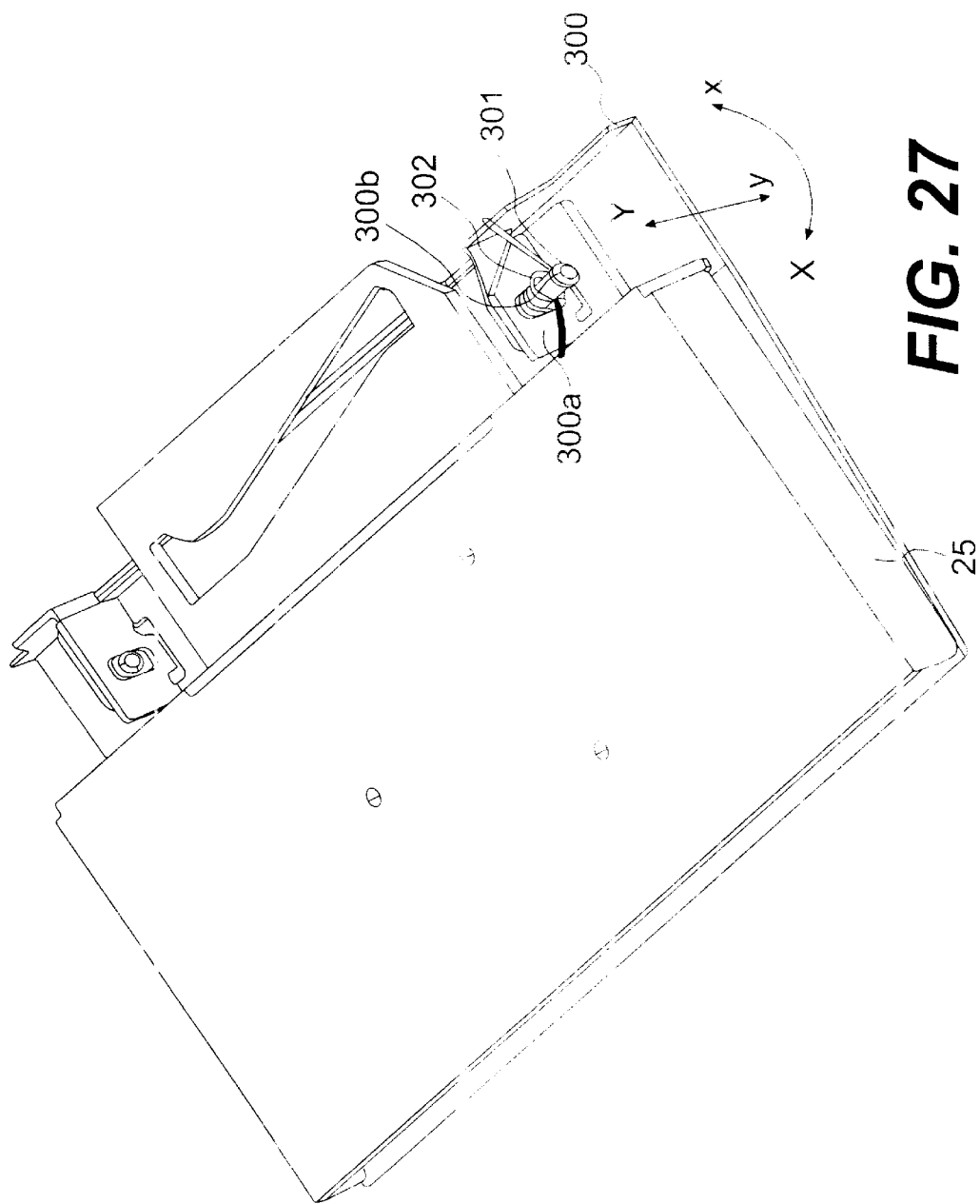
FIG. 27 is a three-dimensional representation of an MD holder seen from the right side.
Figure 28:
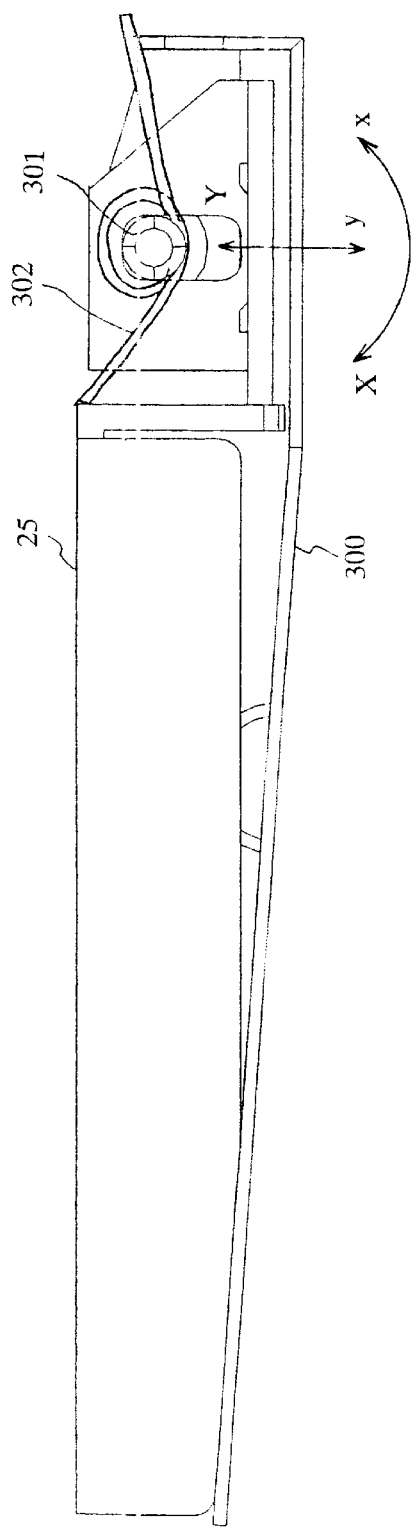
FIG. 28 is a lateral view of the right side of FIG. 27.
Figure 29:
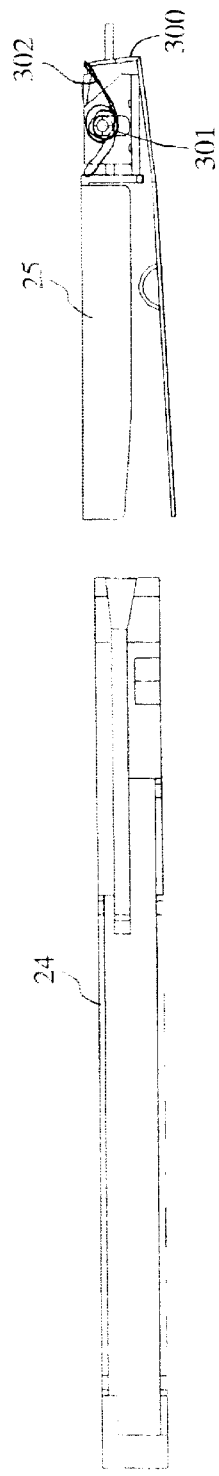
FIG. 29 is a lateral view of the right side of FIG. 24.
Figure 30:
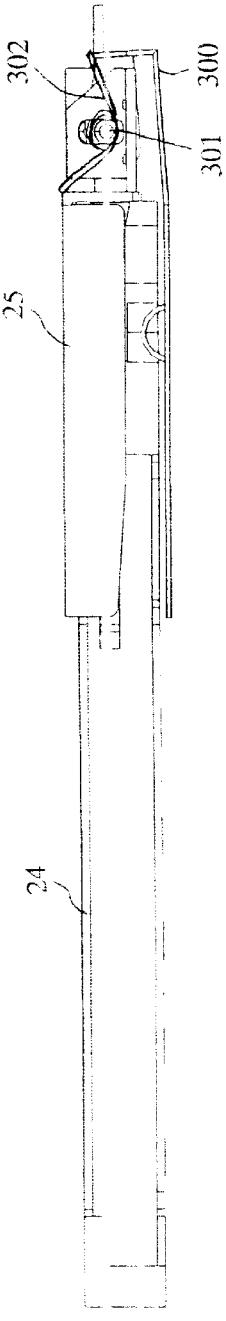
FIG. 30 is a lateral view of the right side of FIG. 25.
Figure 31:
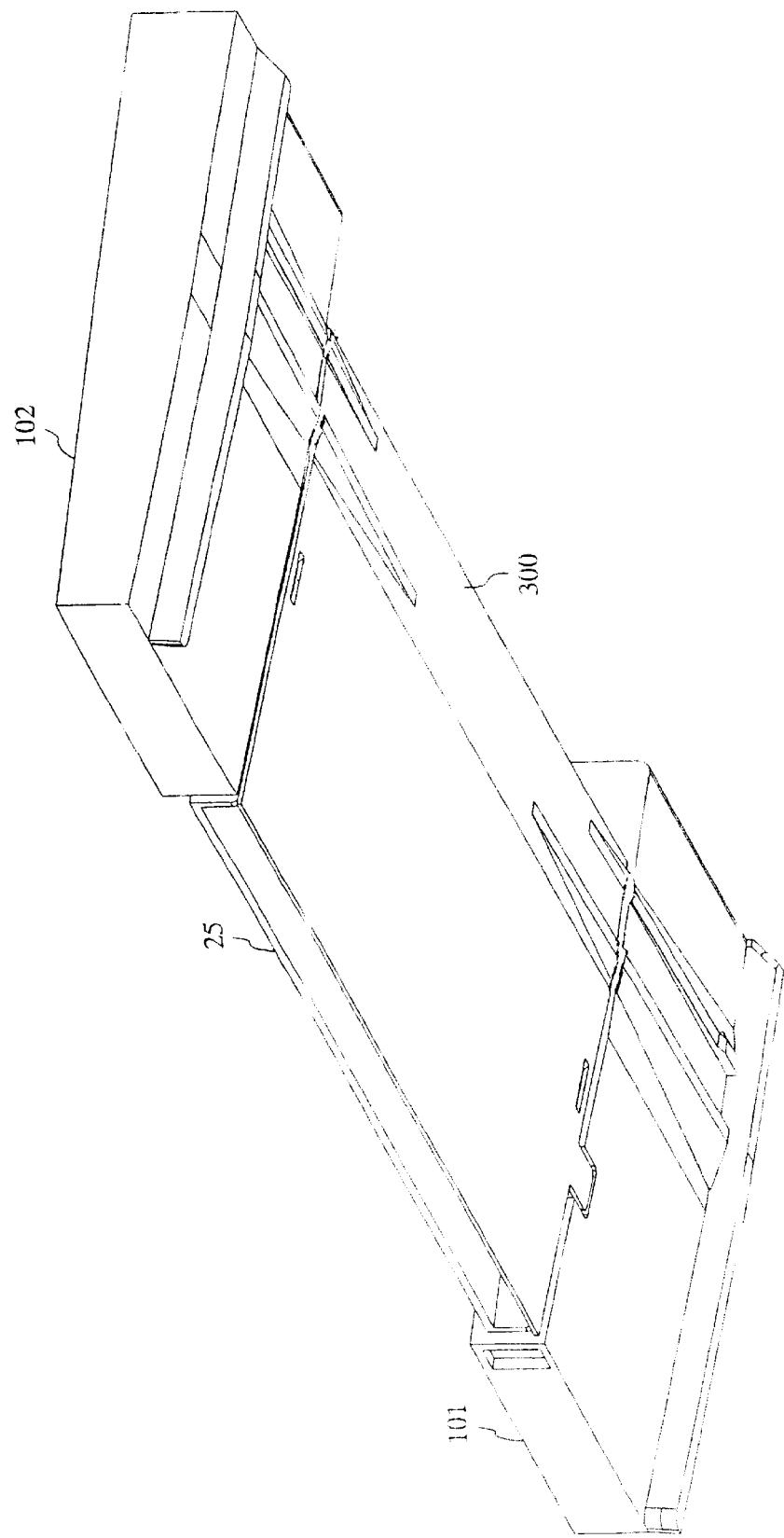
FIG. 31 is a perspective view from the outside of a disk guiding section.

FIG. 25 and FIG. 26 are three-dimensional representations of an MD 24 inserted into the aperture of an MD holder 25 enlarged in this way. FIG. 27 shows a three-dimensional representation of the holder section seen from the right. 302 is a spring which compresses the lower MD holder and CD disk guide in direction X and Y. 301 is an enlarging and rotating central shaft of the lower MD holder and CD disk guide 300 which tensions the spring 302 and which is disposed on the upper MD holder 25. FIG. 28 is a lateral view of the right side of FIG. 27. FIG. 29 is a lateral view of the right side of FIG. 24 and shows the rotation of the lower MD holder and CD disk guide 300. FIG. 30 is a lateral view of the right side of FIG. 25 and shows the enlargement of the lower MD holder and CD disk guide 300. FIG. 31 shows the disk guide section which is comprised by the CD guides 101, 102d and the lower MD holder and CD disk guide 300.

On the basis of the above discussion, the CD carrying mechanism in the scope of the claims corresponds to the carrying roller 11, the gear unit G and the like. The clamp mechanism corresponds to the small diameter disk abutting pin 1, the large diameter disk abutting pin 2, the lever 3, the engaging piece 3a, 4a, the first sliding plate 4, the second sliding plate 6, the pin 15, the clamp lever 17, the clamp lever support member 17a, the clamp 19 and the like. The MD carrying mechanism corresponds to the MD holder 25, the holder drawing lever 39, the linked lever 33, the guide pin 41, the guide hole 42, the holding and guiding member 61 and the like. The clamp lever avoiding mechanism corresponds to the clamp lever 17, the linked lever 33, the holder drawing lever 39 and the like. The MD holder aperture enlargement mechanism corresponds to the enlargement lever 111, the projection 25b and the like.

The operation of the invention will be explained below.

(CD Loading Operation)

When a CD is inserted into the disk device, a sensor (not shown) detects that a CD has been inserted. As a result, a drive motor (not shown) is activated to drive a gear unit G and rotate the carrying roller 11 to the right.

The disk which is gripped by the disk guides 101, 102, 300 and the rotations of the carrying roller 11 is carried further into the disk device by the rotations of the carrying roller 11.

When a small diameter CD is inserted, the outer periphery of the small diameter disk abuts with the small disk abutment pin 1. When a large diameter CD is inserted, the outer periphery of the large diameter disk abuts with the large disk abutment pin 2.

The CD is carried further into the device by the carrying roller 11 as its outer periphery is in abutment with the small disk abutment pin 1 or the large disk abutment pin 2 and so the center of the CD 200 arrives at the center of the turntable. As a result, as shown in FIG. 9, the lever 3 is rotated in the direction a of the arrow about the supporting point 3b by the inserted CD 200.

When the lever 3 is rotated in the direction a, the engaging piece 3a displaces in the direction e of the arrow to abut with the engaging piece 4a of the first sliding plate 4 and thus further slide the first sliding plate 4 in the direction e of the arrow.

As a result, as shown in FIG. 5, the rack 8 formed on the first sliding plate 4 engages with the gear 9 and the first sliding plate 4 further slides in the direction e of the arrow due to the gear 9 which is rotating in a left direction.

When the first sliding plate 4 slides in the direction e of the arrow, the pin 5, which is shown in FIG. 5 as formed on the first sliding plate 4, abuts with the end of the slit 7 formed on the second sliding plate 6 and slides the second sliding plate 6 in the direction e of the arrow.

As a result, the rack 10 formed on the second sliding plate 6 engages with the gear 9 and the gear 9 slides the first sliding plate 4 and the second sliding plate 6 in the direction e of the arrow.

When the second sliding plate 6 slides in the direction e of the arrow, it engages with the S-shaped elongated hole 55 which is formed on the second sliding plate 6. The pin 14 which is formed on an extension 13a of the lifting arm 13 shown in FIG. 10 slides towards the upper end of the S-shaped elongated hole 55 as shown in FIG. 11. As a result, the lifting arm 13 as shown in FIG. 10 rotates in the other direction C about the shaft 13b and the carrying roller support lever 12 rotates in the direction Y of the arrow. Thus the carrying roller 11 is depressed as shown in FIG. 11.

On the other hand, since the pin 15 which is formed on the second sliding plate 6 is displaced in the direction e of the arrow as the second sliding plate slides in direction e, the pin 15, which was abutting with the cam face 16 formed on the clamp lever supporting member 17a as shown in FIG. 5, slides on the cam face 16 and becomes separated from the cam face 16 as shown in FIG. 11.

As a result, the clamp lever supporting member 17a and the clamp lever 17 rotate in the direction D of the arrow as shown in FIG. 9 and the clamp lever 19 which is formed on the tip of the clamp lever 17 clamps the CD 200 on the turntable from above as shown in FIG. 12.

(CD Ejection Operation)

During the CD ejection operation, the drive motor rotates in the opposite direction to that of CD loading. As a result, the gear 9 rotates to the right as shown in FIG. 11 and the first sliding plate 4 and the second sliding plate 6 slide in the direction E of the arrow.

When the second sliding plate 6 slides in the direction E of the arrow, the pin 15 which is formed on the second sliding plate 6 abuts with the cam face 16 on the clamp lever supporting member 17a. The clamp supporting lever 17a is rotated in the direction D of the arrow about the rotation shaft 18 and as shown in FIG. 5, the gripping of the CD 200 by the clamp 19 and the turntable is released. Thus the relation of the clamp lever 17 and the CD 200 is as shown in FIG. 9.

The pin 14 which engages with the S-shaped elongated hole 55 slides the S-shaped elongated hole 55 from the position shown in FIG. 11 and displaces towards the lower end of the S-shaped elongated hole 55 due to the displacement of the second sliding plate 6 in direction E. As a result, the lifting arm 13 rotates in direction c as shown in FIG. 10 and the carrying roller 11 rises and abuts with the rear face of the CD 200. Thus the carrying roller supporting arm 12 and the carrying roller 11 are in the position as shown in FIG. 5.

The CD 200 is gripped at this time by the disk guides 101, 102, 300 and the rotating carrying roller 11 because the carrying roller 11 is rotating to the left due to the drive motor through the gear unit G. Thus the CD 200 is ejected outside the device.

When the rack 8 of the first sliding plate 4 and the rack 10 of the second sliding plate 6 separate, the first sliding plate 4 and the second sliding plate 6 displace in the direction E due to a spring (not shown) and the first sliding plate 4 and the second sliding plate 6 return to an initial position as shown in FIG. 5.

When the CD is ejected as above, both large and small diameter disks are treated in a similar fashion. However since the rising carrying roller 11 may protrude and abut with the edge of small disks, the lever 22 is rotated the direction M about the shaft 23 and the peripheral section of the small disk near the carrying roller is raised upwardly by the action of the pin 21, which is provided on the second sliding plate 6 shown in FIG. 11, on the cam face 22a. The action of the pin 21 is due to the displacement of the second sliding plate 6 in direction E. Thus the carrying roller 11 is prevented from coming into contact with the edge of the small diameter disk.

(MD Loading Operation)

When an MD 24 is inserted into the MD insertion mouth in the CD/MD insertion section, as shown in FIG. 24, the side of the tip of the inserted MD 24 abuts with the MD insertion mouth screen 112. As a result, the MD insertion mouth screen 112 rotates in the direction Q and an end of the enlargement lever 111 is raised upwards. Since the other end of the enlargement lever 111 rotates about the shaft 111a and depresses the projection 25b downwards. The lower MD holder and CD disk guide 300 is opened in the direction r (the direction X in FIGS. 27 and 28) and the aperture of the MD holder 25 is rotated. When the MD 24 is pushed further, the MD 24 enlarges the lower MD holder 300 in the direction y of FIG. 28. Thus the MD 24 is in a completely inserted state as shown in FIG. 30. This state is shown in FIG. 13.

When the MD 24 is inserted into the MD holder 25, a sensor (not shown) detects the insertion and operates a motor (not shown) to drive a gear unit G. As a result, the third sliding plate 26 is displaced in the direction e as shown in FIG. 17 by a member (not shown). The rack 27 formed on the third sliding plate 26 engages with the gear. 28 as shown in FIG. 13. Thereafter the third sliding plate 26 displaces in the direction e due to the rotations of the gear 28. Since the pin 48 on the relay member 47 is engaged with the S-shaped elongated hole 49, it rotates in the direction j as shown by FIG. 18 and the intermediate member 52, which has an arc shaped elongated hole 51 with which the pin 50 of the relay member 47 engages, displaces in the same direction as the third sliding plate 26. At this time, the intermediate member 52 displaces while rotating in the direction d as shown in FIGS. 17, 18, and 19.

The engaging piece 43 of the third sliding plate 26 abuts with the engaging piece 3a of the lever 3 due to the displacement of the third sliding plate 26 in the direction e. The engaging piece 4a of the first sliding plate 4 is pushed through the engaging piece 3a and the first sliding plate 4 displaces in the direction e. As a result, the movement of the first and second sliding plates 4, 6 is the same as the action of storing a CD as explained above.

The pin 53 which is formed on the clamp lever 17 as shown in FIG. 20 abuts with the end of the slit 54 of the intermediate member 52 together with the displacement of the third sliding plate 6 in direction e. The clamp lever 17 rotates about the rotation shaft 29 in direction f and displaces in a rear direction which does not impede the storage of the MD 24.

The linked lever 33 displaces in direction g and rotates about the shaft 30 due to the rear displacement of the clamp lever 17. Together with this displacement, the holder drawing lever 39 rotates in the direction h about the shaft 34. The MD holder 25, on which is formed an elongated hole 36 which engages with the pin 35 on the tip of the holder drawing lever 39 as shown in FIG. 15, is drawn into the device.

The MD holder 25 is drawn into the device without any positional divergence due to the guide pin 41 and the guide hole 42 as shown in FIG. 14.

The MD 24 opens a slide screen 24a as a result of a member which is not shown during the process of being drawn into the device and arrives at a fixed position in the device.

The pin 45 which is provided on the lateral face of the MD holder support member 44 slides the cam face 46 which is formed on the second sliding plate 6 downwardly due to the displacement of the second sliding plate 6 together with the motion of the second sliding plate 6 in the direction e. As a result, the MD holder supporting member 44 inclines the MD insertion in the direction i as shown in FIG. 16. The MD 24 is placed on the turntable.

Since the plate shaped shaft 62 which projects towards both sides of the holding and guiding member 61 is engaged to rotate with respect to the bearing 63 which is formed on the MD holder supporting member 44 as shown in FIG. 14, the holding and guiding member 61 can achieve a horizontal position even if the MD holder supporting member 44 inclines in the direction i. As a result, it is possible to place the MD 24 held by the MD holder 25 horizontally on the turntable.

When the MD 24 is loaded onto the turntable as shown in FIG. 24, the carrying roller 11 is depressed for the same reasons as explained above in connection with the storage of a CD.

(MD Ejection Operation)

When an MD 24 is taken from a position as loaded on a turntable and ejected out of the device, a drive motor (not shown) rotates in the opposite direction to that when an MD is loaded. As a result, the first and second sliding plates 4, 6 displace in direction E. The third sliding plate 26 displaces in the direction E from the position in FIG. 16 to that shown in FIG. 15. The clamp lever 17 rotates back to an initial position. Together with the action of the clamp lever 17, the linked lever 33 and the holder drawing lever 39 rotate in the direction of the carrying roller 11. The MD 24 is supported on the MD holder 25 as shown in FIG. 14 and the MD 24 is placed in a position in which it can be ejected outside the device as the MD insertion mouth screen 112 from the MD insertion mouth in the CD/MD insertion mouth is opened in the direction q shown in FIG. 23.

As shown above, according to embodiment 1, a drive motor is driven and thus enables a disk device to load and eject an MD which is a type of disk stored in a cartridge, a small diameter disk and a large diameter disk with high reliability.

According to embodiment 1, the invention is adapted to dispose CD guides 101, 102 on both sides of an MD holder 25 and thus reduce the width of the device.

Furthermore according to embodiment 1, when an MD is inserted from an MD insertion mouth, the aperture of a MD holder 25 is expanded. Thus it is easy to store an MD in the MD holder 25 and as a result, user-friendliness is enhanced.

As shown above, a disk device according to the present invention is adapted for use as a disk device in a vehicle which can use MD disks which are disks stored in a cartridge and disks of varying sizes.

What is claimed is:

1. A disk device which carries non-cartridge stored disks of different sizes and cartridge stored disks, loads said cartridge stored and non-cartridge stored disks onto a turntable, and ejects said cartridge stored and non-cartridge stored disks from said turntable, said disk device comprising:

a circular disk carrying mechanism having a carrying roller which loads and ejects said non-cartridge stored disks; and a cartridge carrying mechanism which is provided with a holder for supporting and enclosing a portion of said cartridge stored disks, said cartridge carrying mechanism loads said cartridge stored disk onto a turntable and ejects said cartridge stored disk from a turntable, in a planar direction, by the displacement of a carrying arm operatively connected to said holder, and displacing said holder upon movement thereof.

2. A disk device according to claim 1, wherein said disk device further comprises a guide mechanism for guiding said non-cartridge stored disk carried by said carrying roller from an upper side of said carrying roller, and wherein said holder is disposed in a position as a part of said guide mechanism.

3. A disk device according to claim 2, wherein said holder is disposed so as to divide said guide mechanism on a central section of said guide mechanism, forming an aperture, wherein said holder is disposed therein.

4. A disk device according to claim 2, wherein a lower face of said holder acts as part of said guide mechanism for said non-cartridge stored disk during a loading and ejection operation.

5. A disk device according to claim 1, wherein said disk device further comprises an insertion mouth screen into which said cartridge stored disk is inserted and which acts as a displaceable base for an insertion mouth for inserting disks into said holder.

6. A disk device according to claim 1, wherein said disk device further comprises a holder aperture enlarging mechanism which enlarges the aperture of said holder by rotating and displacing the lower face of the aperture of said holder downwardly.

7. A disk device for loading and ejecting cartridge stored disks and non-cartridge stored disks having different diameters, from a turntable, said disk device comprising:

a disk guide mechanism having a lower surface and a central aperture, said disk guide mechanism guiding said cartridge stored and said non-cartridge stored disks during a loading and ejection operation;

a cartridge holder for holding said cartridge stored disk in a opening thereof, said cart-ridge holder disposed within said aperture of said disk guide mechanism;

a cartridge holder cover rotatably provided to augment said opening of said cartridge holder upon an insertion of said cartridge stored disk; and a carrying arm movably attached to said cartridge holder, said carrying arm moving said cartridge holder in a planar direction during said loading and ejection operation.

8. A disk device according to claim 7, wherein said lower surface of said disk guide mechanism and a surface of said cartridge holder guides an upper surface of said non-cartridge stored disk, during said loading and ejection operation.

9. A disk device according to claim 7, wherein a periphery of said central aperture of said disk guide mechanism slidably guides an outer edge of said cartridge holder, said central aperture being positioned evenly within said disk guide mechanism and above said lower surface.

10. A disk device according to claim 7, further comprising a carrying roller for loading and ejecting said non-cartridge stored disk.

11. A disk device according to claim 7, wherein said cartridge holder cover guides an upper surface of said cartridge stored disk.

12. A disk device according to claim 7, wherein said carrying arm is part of a link mechanism, said link mechanism movably displacing said carrying arm.

13. A disk device according to claim 7, wherein said cartridge holder cover is disposed over a length of said opening of said cartridge holder.

14. A disk device according to claim 7, wherein a portion of said cartridge holder cover abuts a lever, said lever augmenting said opening of said cartridge holder upon said insertion of said cartridge stored disk.

15. A disk device according to claim 7, wherein said central aperture of said disk guide mechanism is rectangular shaped.

* * * * *